(12) United States Patent
Clouser

(10) Patent No.: US 9,732,784 B2
(45) Date of Patent: Aug. 15, 2017

(54) STATIONS FOR PORTABLE ELECTRONIC DEVICES

(71) Applicant: Doug Clouser, Dublin, OH (US)

(72) Inventor: Doug Clouser, Dublin, OH (US)

(*) Notice: Subject to any disclaimer, the term of this patent is extended or adjusted under 35 U.S.C. 154(b) by 0 days.

(21) Appl. No.: 14/807,985

(22) Filed: Jul. 24, 2015

(65) Prior Publication Data

US 2015/0330437 A1   Nov. 19, 2015

Related U.S. Application Data

(63) Continuation-in-part of application No. 14/327,862, filed on Jul. 10, 2014, which is a continuation-in-part of application No. 14/246,718, filed on Apr. 7, 2014, now abandoned, which is a continuation of application No. 13/190,251, filed on Jul. 25, 2011, now Pat. No. 8,692,511, which is a continuation-in-part of application No. 13/189,180, filed on Jul. 22, 2011, now Pat. No. 8,692,514.

(60) Provisional application No. 61/367,074, filed on Jul. 23, 2010.

(51) Int. Cl.
| | |
|---|---|
| *H02J 7/00* | (2006.01) |
| *F16B 47/00* | (2006.01) |
| *F16M 11/04* | (2006.01) |
| *F16M 11/08* | (2006.01) |
| *F16M 13/02* | (2006.01) |

(52) U.S. Cl.
CPC ............ *F16B 47/003* (2013.01); *F16B 47/00* (2013.01); *F16M 11/041* (2013.01); *F16M 11/08* (2013.01); *F16M 13/022* (2013.01); *H02J 7/0044* (2013.01)

(58) Field of Classification Search
USPC ............ 320/115, 113, 107, 114; 211/8, 70.6; 248/221.12, 220.22, 220.31, 220.42, 248/222.13, 222.14, 222.41, 225.11, 683, 248/205.5, 206.3, 206.2
See application file for complete search history.

(56) References Cited

U.S. PATENT DOCUMENTS

| | | | | | |
|---|---|---|---|---|---|
| 2,627,982 | A | * | 2/1953 | Williams | .................. A47F 5/08 |
| | | | | | 211/88.01 |
| 2,889,050 | A | * | 6/1959 | Modrey | .................. A47G 29/10 |
| | | | | | 211/4 |
| 4,326,761 | A | * | 4/1982 | Schwartz | ................ A47G 29/10 |
| | | | | | 206/580 |
| 4,494,661 | A | * | 1/1985 | Krusche | ................ A47B 96/061 |
| | | | | | 211/87.01 |
| 4,509,648 | A | * | 4/1985 | Govang | ................ A47F 5/0846 |
| | | | | | 211/59.1 |
| 4,848,855 | A | * | 7/1989 | Cone | ...................... A47B 67/04 |
| | | | | | 211/133.1 |

(Continued)

*Primary Examiner* — Terrell McKinnon
*Assistant Examiner* — Michael McDuffie
(74) *Attorney, Agent, or Firm* — Porter, Wright, Morris & Arthur, LLP

(57) ABSTRACT

A station for at least one portable electronic device includes a base having a substantially vertical and forward-facing wall and at least one suction cup secured to the wall to temporarily secure the portable electronic device to the wall in a position that the portable electronic device can be viewed and operated while secured to the wall. More than one suction cup can be provided to secure the portable electronic device to the wall.

16 Claims, 30 Drawing Sheets

SECTION VIEW

(56) References Cited

U.S. PATENT DOCUMENTS

| | | | | |
|---|---|---|---|---|
| 4,893,777 A * | 1/1990 | Gassaway | E05B 73/0082 | 211/8 |
| 5,062,533 A * | 11/1991 | Fickes | B65B 67/1244 | 211/12 |
| 5,154,304 A * | 10/1992 | McAuley | A47F 5/0846 | 211/106.01 |
| 5,316,249 A * | 5/1994 | Anderson | H01H 9/025 | 211/26.1 |
| 5,725,107 A * | 3/1998 | Dembicks | B25H 3/06 | 206/378 |
| 5,762,211 A * | 6/1998 | Ensign | A47F 5/0861 | 211/4 |
| 5,921,407 A * | 7/1999 | Kabanek | A61B 19/0256 | 211/65 |
| 5,988,408 A * | 11/1999 | Evans | B25H 3/04 | 211/60.1 |
| 6,202,865 B1 * | 3/2001 | Kuo | A47F 5/0815 | 211/70.6 |
| 6,329,597 B1 * | 12/2001 | Kaloustian | A47B 21/06 | 174/67 |
| 6,427,497 B1 * | 8/2002 | Mossberg, Jr. | A47B 81/005 | 211/4 |
| 6,755,056 B2 * | 6/2004 | Igelmund | E05B 73/0005 | 248/499 |
| 6,844,494 B1 * | 1/2005 | Nevins | H01R 25/003 | 174/135 |
| 6,997,333 B2 * | 2/2006 | Howard | A47G 29/10 | 211/85.9 |
| 7,270,309 B2 * | 9/2007 | Burns | F16M 13/02 | 211/162 |
| 7,441,426 B2 * | 10/2008 | Avganim | E05B 73/0082 | 70/14 |
| 7,499,270 B2 * | 3/2009 | Allen | E05B 73/0082 | 211/8 |
| 7,868,250 B2 * | 1/2011 | Kolada | H01R 13/60 | 174/135 |
| 7,909,295 B2 * | 3/2011 | Powers | F16M 11/04 | 248/121 |
| 8,157,228 B2 * | 4/2012 | Smith | E04F 21/1855 | 248/222.14 |
| 8,522,969 B2 * | 9/2013 | Mason | A45D 44/06 | 206/234 |
| 2004/0099775 A1 * | 5/2004 | Zheng | B60R 11/02 | 248/206.3 |
| 2006/0038097 A1 * | 2/2006 | Diller | A61G 13/101 | 248/218.4 |
| 2007/0131828 A1 * | 6/2007 | Chang | F16B 47/00 | 248/205.5 |
| 2011/0155875 A1 * | 6/2011 | Hofman | A47F 5/0815 | 248/220.31 |
| 2013/0170823 A1 * | 7/2013 | McDonald | G03B 17/565 | 396/428 |
| 2013/0341412 A1 * | 12/2013 | Johnson | F16B 47/00 | 235/492 |
| 2014/0124644 A1 * | 5/2014 | Wong | E05B 73/0082 | 248/553 |
| 2015/0070839 A1 * | 3/2015 | Johnson | G06F 1/1626 | 361/679.56 |

* cited by examiner

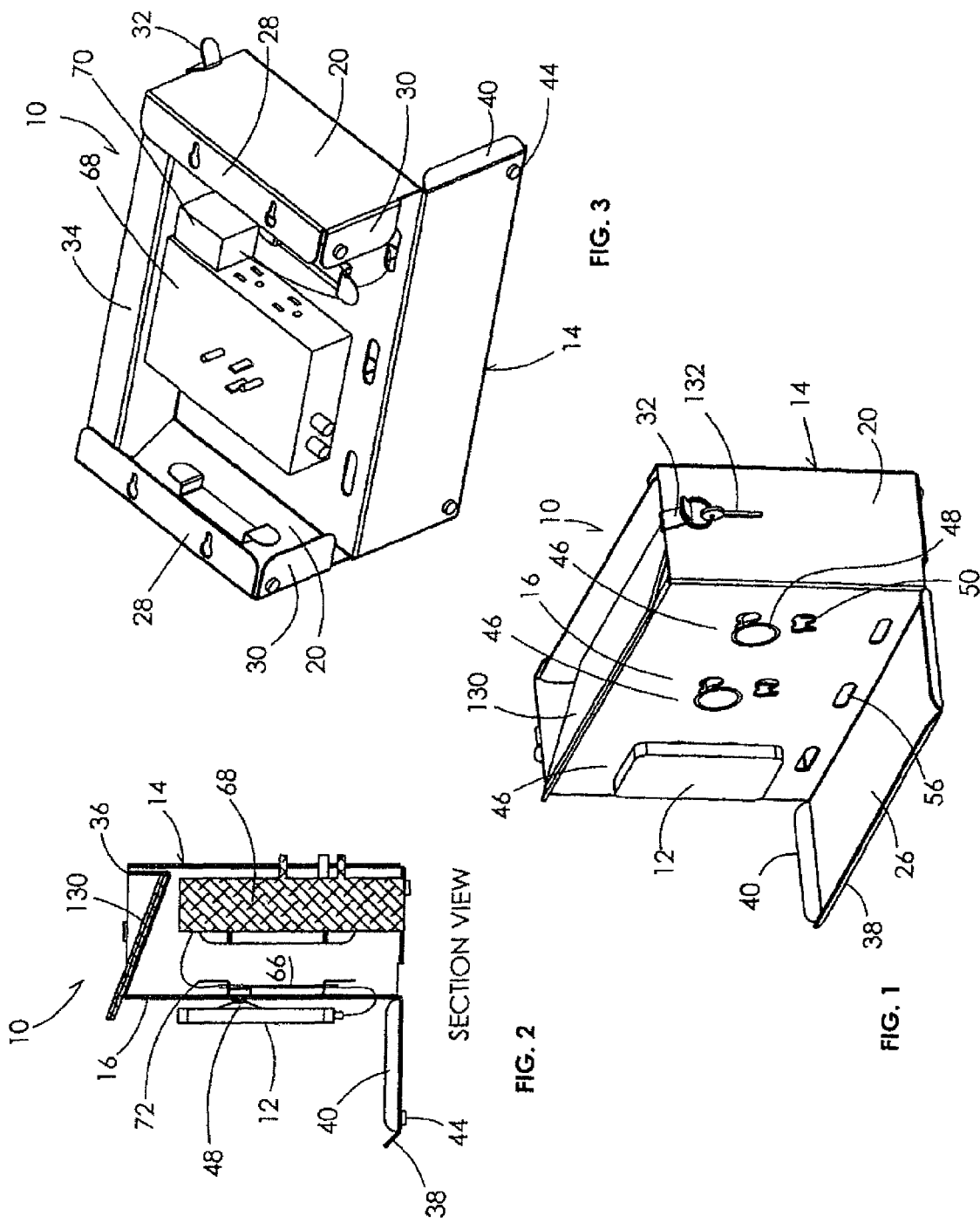

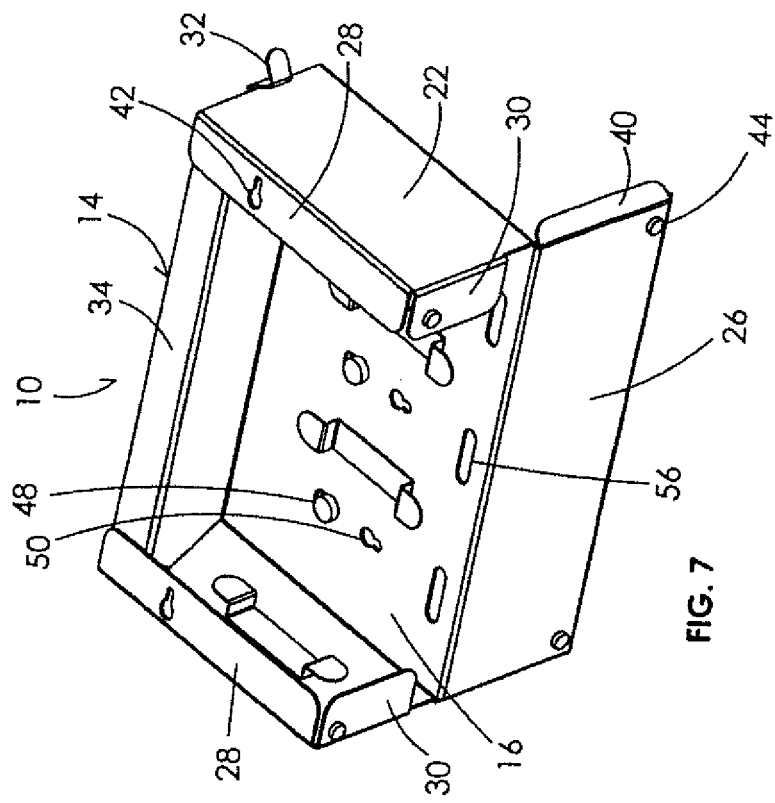
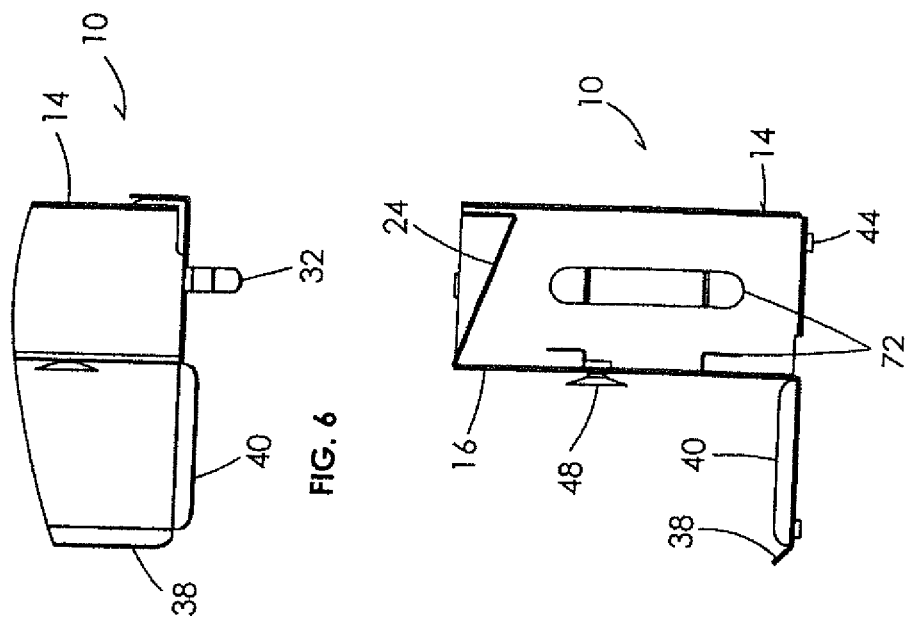
FIG. 7
FIG. 6
FIG. 5

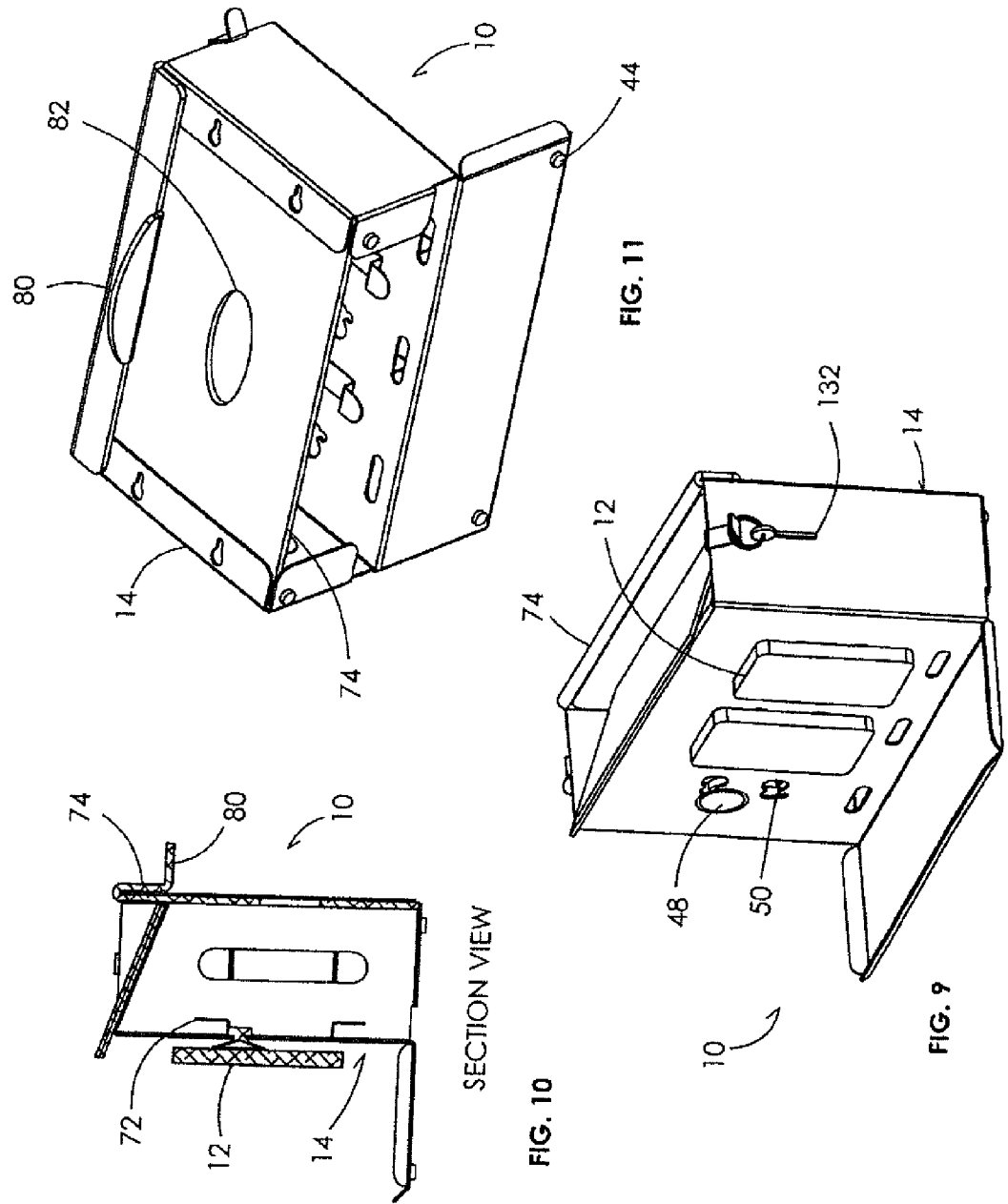

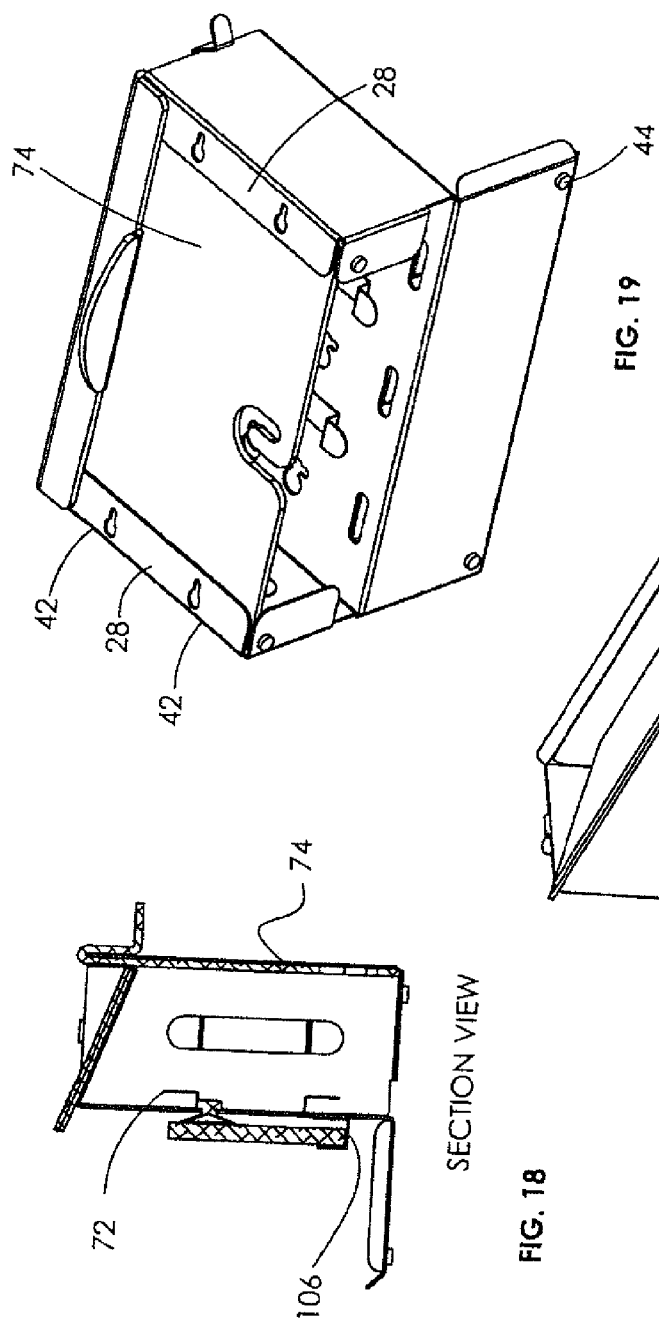

FIG. 24
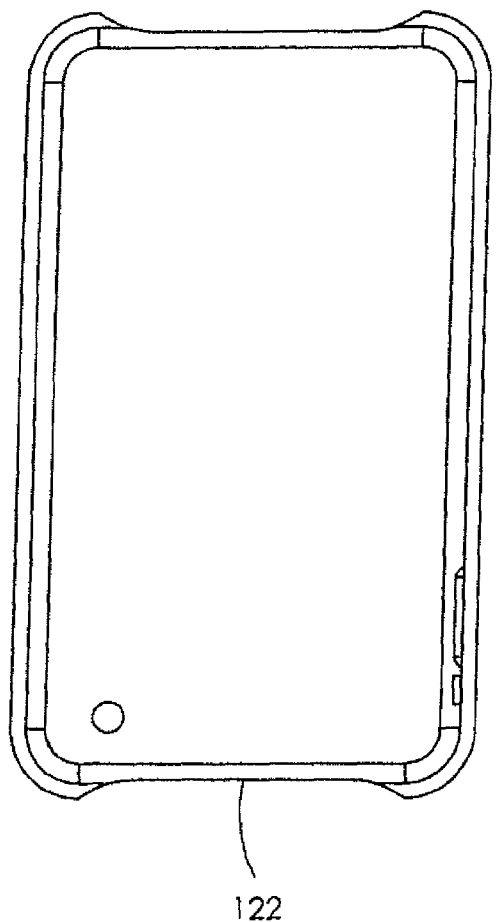
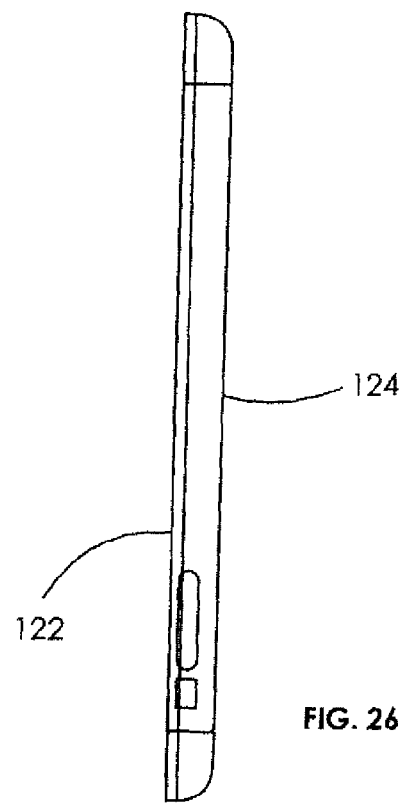
FIG. 26
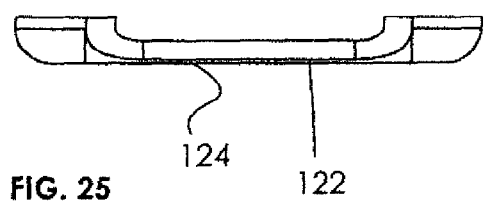
FIG. 25

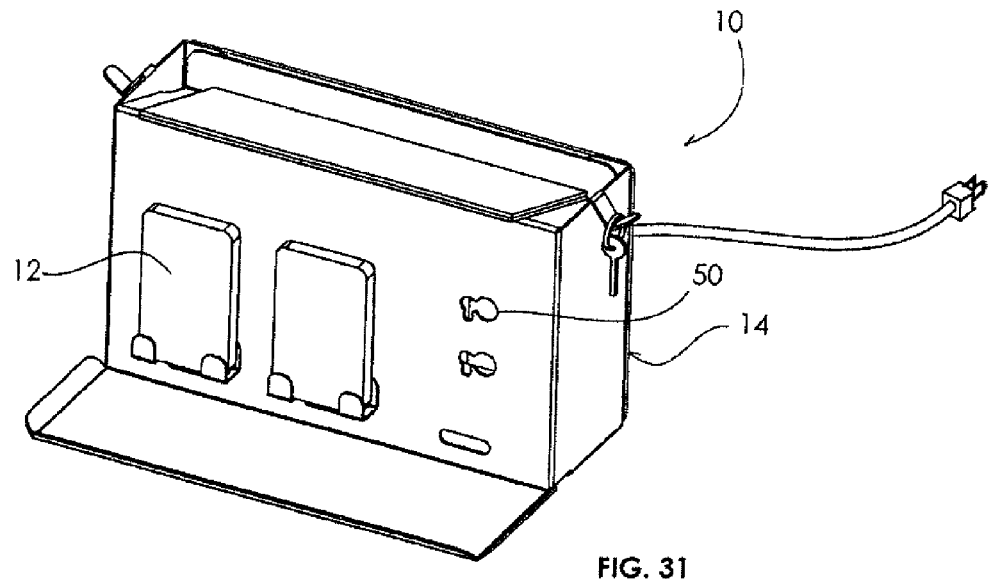
FIG. 31
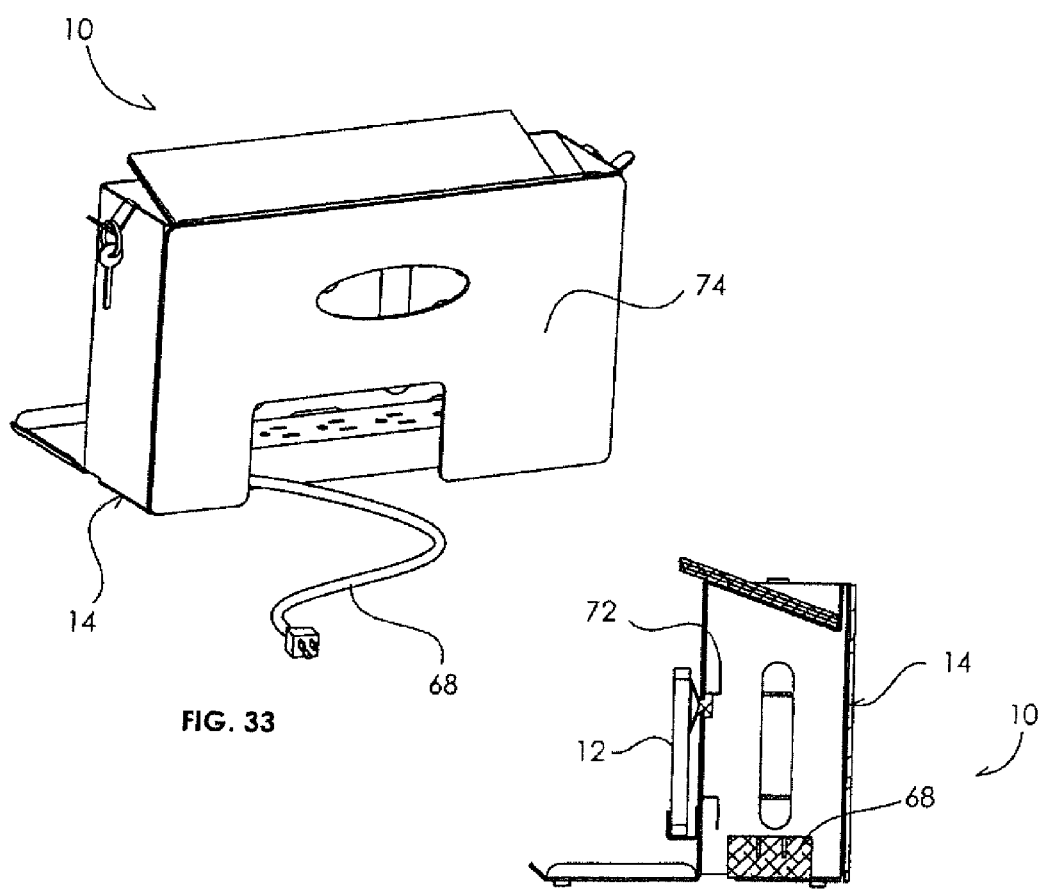
FIG. 33
FIG. 32

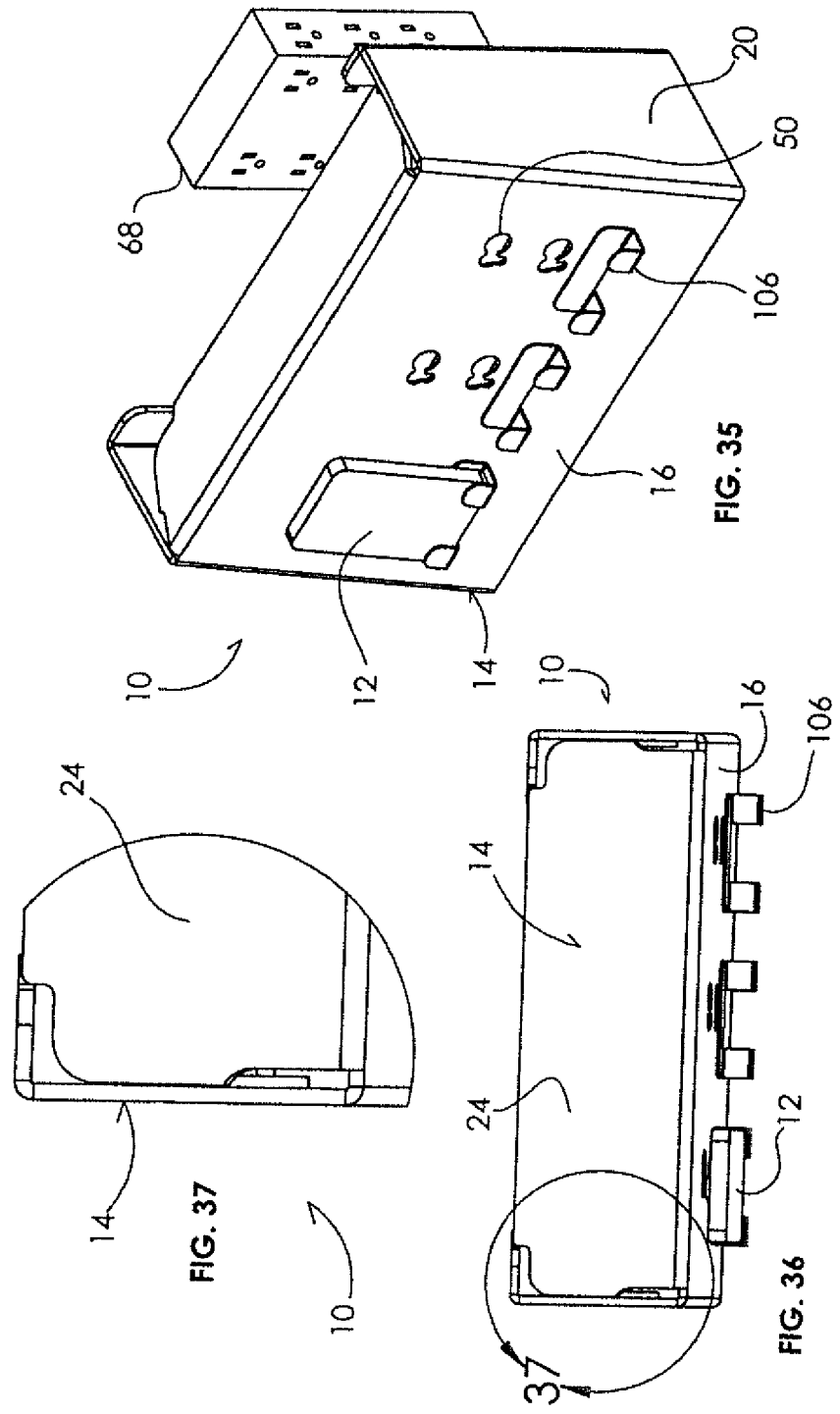

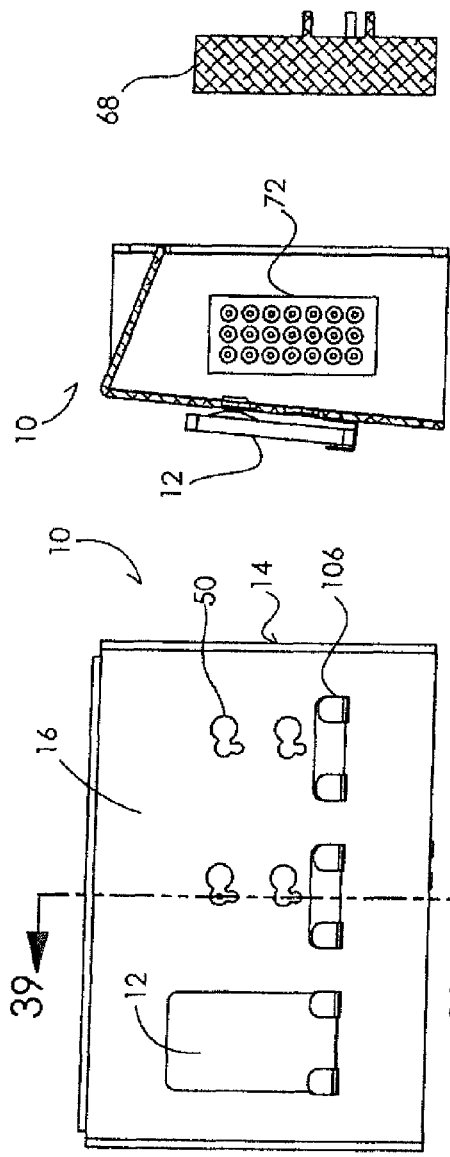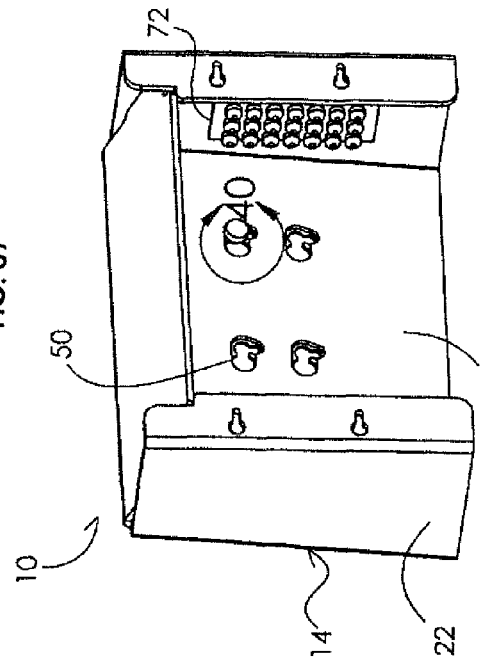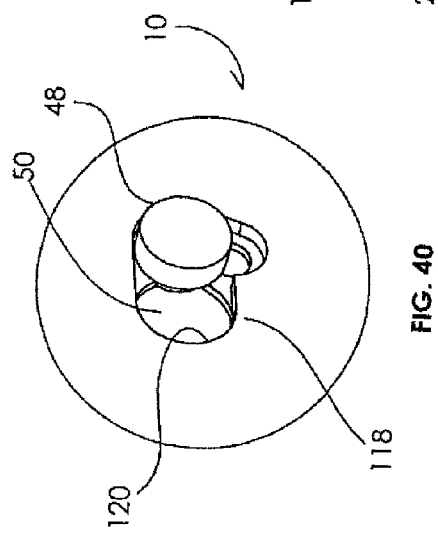

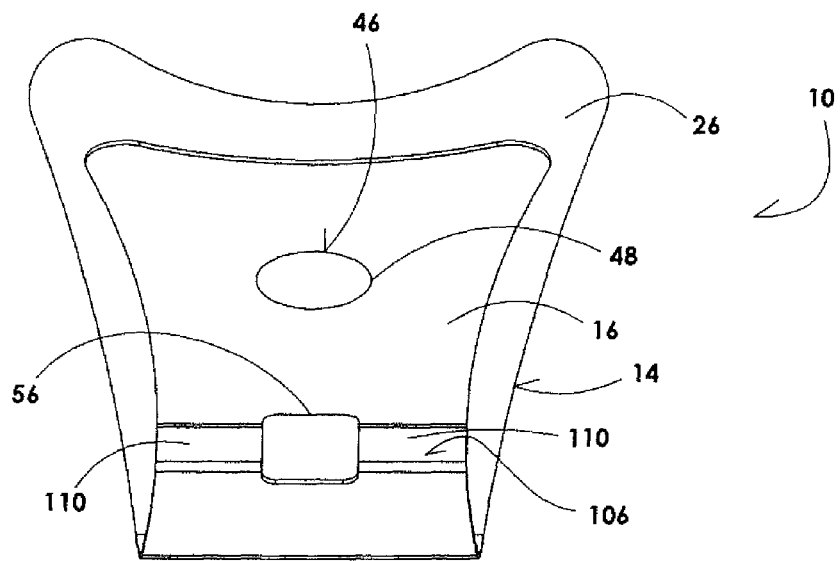
FIG. 51
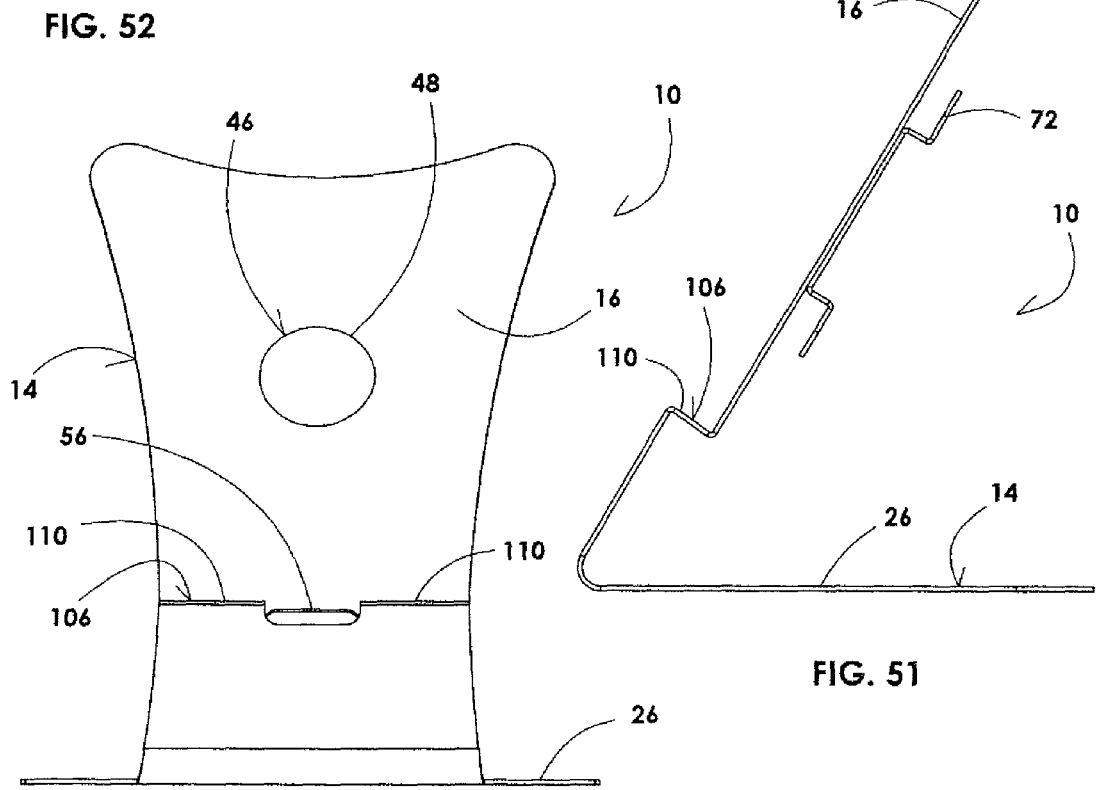
FIG. 52
FIG. 50

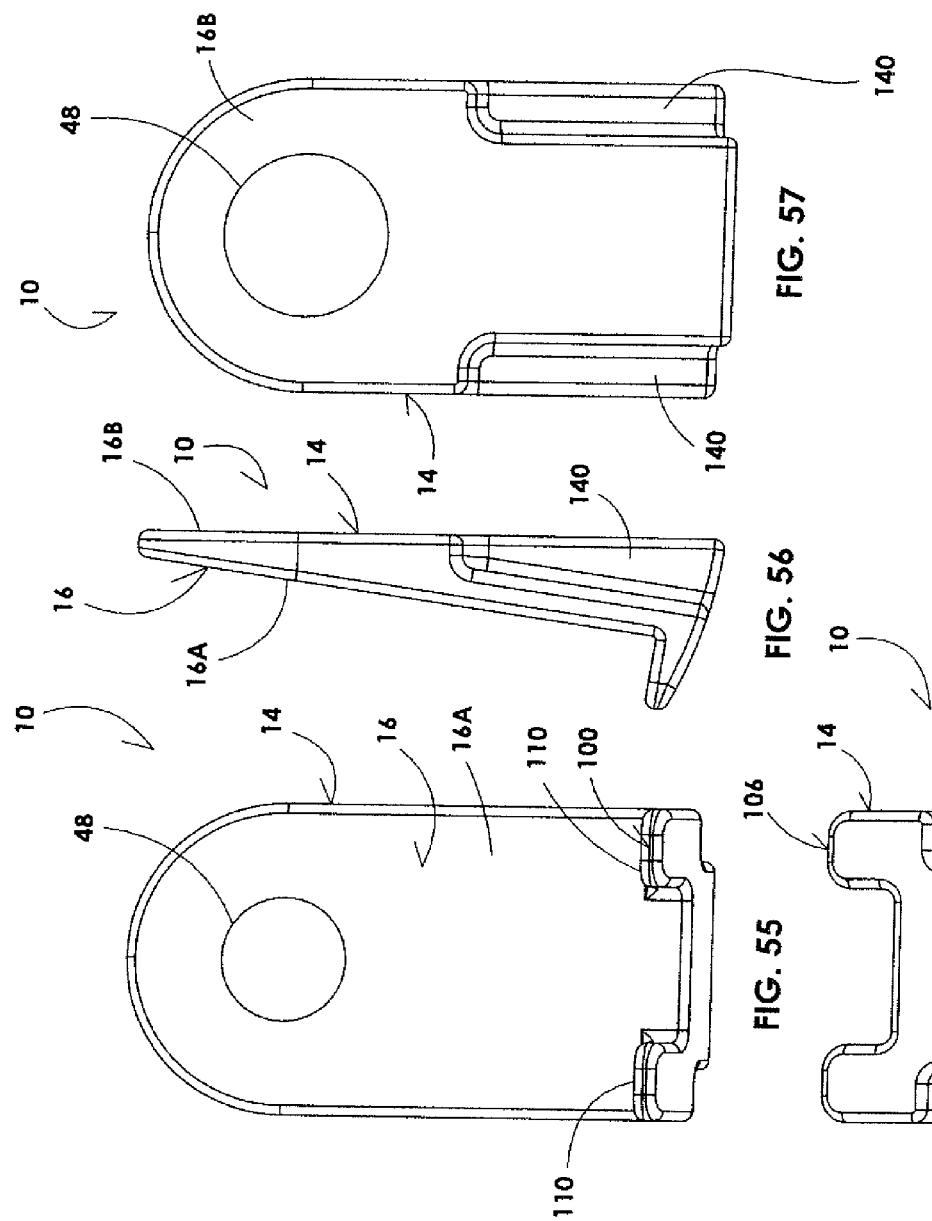

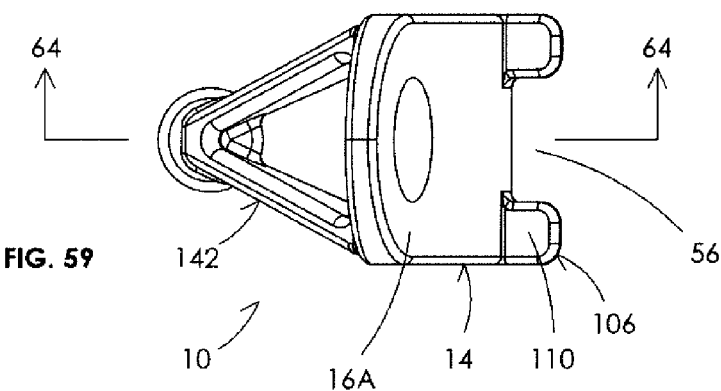
FIG. 59
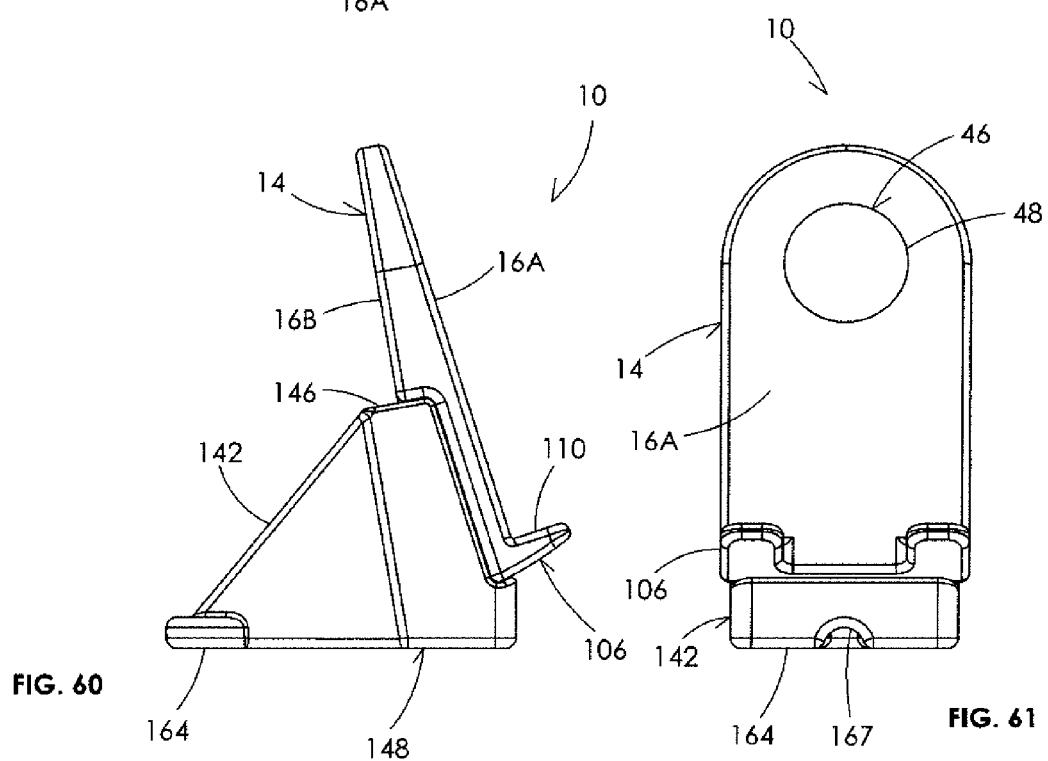
FIG. 60
FIG. 61
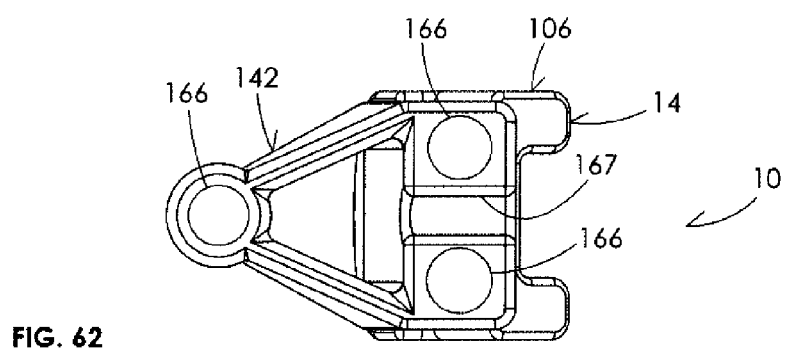
FIG. 62

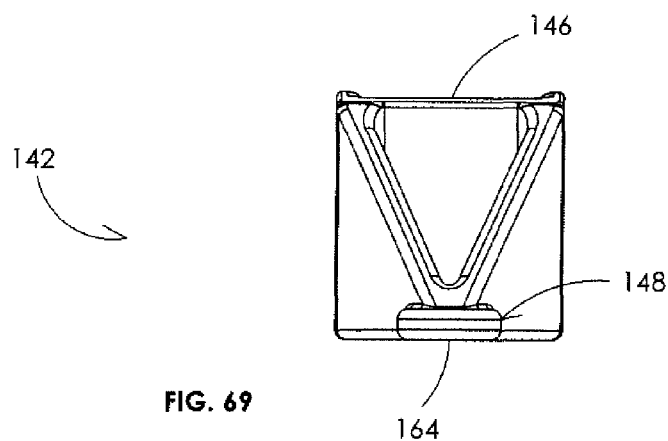
FIG. 69
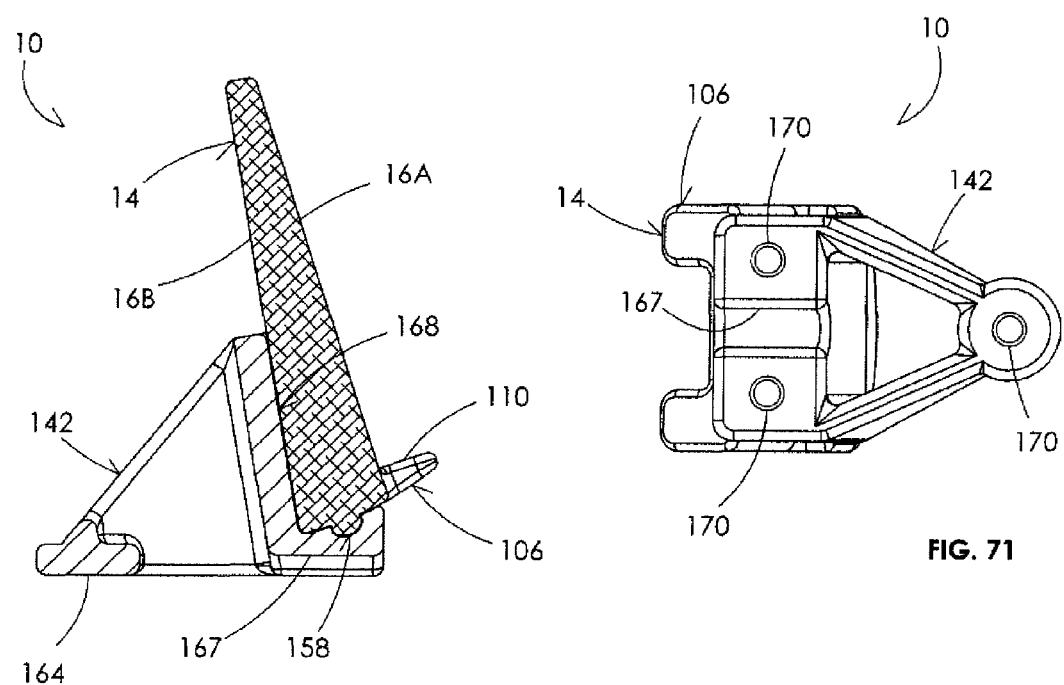
FIG. 70
FIG. 71

STATIONS FOR PORTABLE ELECTRONIC DEVICES

CROSS-REFERENCE TO RELATED APPLICATIONS

This application is a continuation-in-part of U.S. patent application Ser. No. 14/327,862 filed on Jul. 10, 2014, which is a continuation-in-part of U.S. patent application Ser. No. 14/246,718 filed on Apr. 7, 2014, now abandoned, which is a continuation of U.S. patent application Ser. No. 13/190,251 filed on Jul. 25, 2011, issued as U.S. Pat. No. 8,692,511, which is a continuation-in-part of U.S. patent application Ser. No. 13/189,180 filed on Jul. 22, 2011, issued as U.S. Pat. No. 8,692,514, which claims priority from U.S. Provisional Patent Application No. 61/367,074 filed on Jul. 23, 2010, the disclosures of which are expressly incorporated herein in their entireties by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to docking or charging stations for portable electronic devices and, more particularly, to such stations which permit viewing and operation of the portable electronic devices.

BACKGROUND OF THE INVENTION

Portable electronic devices such as, telephones, personal digital assistants (PDAs), digital cameras, mp3 players, tablet computers, and the like, typically utilize rechargeable batteries as a power source. The batteries are typically recharged by plugging an AC to DC power converter into the portable electronic device and into an AC power wall receptacle or outlet. The AC to DC power converter converts 110 or 120 volt AC power from the wall outlet to low voltage DC power used to charge the batteries.

With the increase in the number of available portable electronic devices, consumers can find themselves with an unpleasant and unsightly tangle of wires, cords, and/or cables for the devices. This is because each of the devices can require a different type of AC to DC converter. In addition to the unsightly appearance, the tangled wires can be unsafe because kinked wires are more susceptible to failure and because it is difficult to identify a particular cable when it is intertwined with other cables.

This problem has led to the introduction of battery charging stations that provide a mechanism for recharging the batteries of multiple personal electronic devices. Such stations can be convenient and useful for eliminating the tangle of wires. However, such stations are inadequate in that they make it difficult to view and/or use the personal electronic devices and/or are not multifunctional. Accordingly, there is a need for improved stations for portable electronic devices that improve visibility and usability of the personal electronic and/or organizes and holds other objects that do not need to be charged such as mail, keys, wallets and the like.

SUMMARY OF THE INVENTION

Disclosed are stations for personal electronic devices which address one or more issues of the related art. Disclosed is a station for viewing and operating a portable electronic device. The station comprises, in combination, a wall plate having a rearward-facing back wall configured to be removably secured on a vertically-extending support surface. The wall plate has a forward-facing front wall no more than 45 degrees from vertical and configured to support the portable electronic device so that the portable electronic device can be viewed and operated without holding the portable electronic device. The wall plate has a bottom support located at a bottom of the forward-facing front wall to limit downward movement of the portable electronic device relative to the wall plate.

Also disclosed is a kit for forming stations to view and operate a portable electronic device. The kit comprises, in combination, a wall plate having a rearward-facing back wall configured to be removably secured on a vertically-extending support surface, and a desktop receptacle configured for selectively holding the wall plate and configured to be supported on a horizontally-extending support surface. The wall plate has a forward-facing front wall no more than 45 degrees from vertical and configured to support the portable electronic device so that the portable electronic device can be viewed and operated without holding the portable electronic device. The kit further comprises a plurality of removable fasteners for selective attachment to the forward-facing front wall so that at least one of the removable fasteners can temporarily secure the portable electronic device to the forward-facing front wall, and a plurality of removable fasteners for selective attachment to the rearward-facing back wall so that at least one of the removable fasteners can selectively secure the wall plate to the vertically-extending support surface.

Also disclosed is a method for viewing and operating a portable electronic device. The method comprising the steps of, in combination, removably securing a portable electronic device to forward-facing front wall of a wall plate, selectively securing a rearward-facing back wall of the wall plate to a vertically-extending support surface with at least one removable fastener so that the portable electronic device can be viewed and operated while supported by the vertically-extending support surface, and selectively resting the wall plate on a desktop receptacle supported on a horizontally-extending support surface so that the portable electronic device can be viewed and operated while supported by the horizontally-extending support surface. The forward-facing front wall is no more than 45 degrees from vertical.

From the foregoing disclosure and the following more detailed description of various preferred embodiments it will be apparent to those skilled in the art that the present invention provides a significant advance in the technology and art of stations for portable electronic devices. Particularly significant in this regard is the potential the invention affords for providing relatively low cost, versatile, and easy to use stations which improve usability of the personal electronic devices. Additional features and advantages of various preferred embodiments will be better understood in view of the detailed description provided below.

BRIEF DESCRIPTION OF THE DRAWINGS

These and further features of the present invention will be apparent with reference to the following description and drawings.

FIG. 1 is a front perspective view of a charging station for portable electronic devices according to a first embodiment of the present invention.

FIG. 2 is a section view of the charging station of FIG. 1.

FIG. 3 is a rear perspective view of the charging station of FIGS. 1 and 2.

FIG. 5 is a sectional view similar to FIG. 2 but showing the station with an outlet or wall-plug style surge protector removed for clarity.

FIG. 6 is a fragmented top plan view showing the left end of the charging station of FIGS. 1 to 5.

FIG. 7 is rear perspective view similar to FIG. 3 but showing the station with the wall-plug style surge protector removed for clarity.

FIG. 9 is a front perspective view similar to FIG. 1 but showing the station with a rear cover added for use in a desktop application.

FIG. 10 is a section view similar FIG. 2 but showing the station with the rear cover of FIG. 9.

FIG. 11 is a rear perspective view similar FIG. 3 but showing the station with the rear cover of FIGS. 9 and 10.

FIG. 17 is a front perspective view similar to FIG. 9 but showing the station with bottom supports for the portable electronic devices.

FIG. 18 is a section view similar FIG. 10 but showing the station with the bottom supports of FIG. 17.

FIG. 19 is a rear perspective view similar FIG. 11 but showing the station with additional mounting openings.

FIG. 24 is a front elevational view of a plastic sleeve for a portable electronic device which provides a planar attachment surface for use with the charging stations of FIGS. 1 to 23.

FIG. 25 is a bottom plan view of the sleeve of FIG. 24.

FIG. 26 is a left side elevational view of the sleeve of FIGS. 24 and 25.

FIG. 31 is a perspective view a variation of the charging station of FIGS. 1 to 7 wherein the wall-style surge protector is replaced with a strip-style surge protector.

FIG. 32 is a section view of the charging station of FIG. 31.

FIG. 33 is a rear perspective view of the charging station of FIGS. 31 and 32.

FIG. 35 is a front perspective view of a charging station for portable electronic devices according to a seventh embodiment of the present invention.

FIG. 36 is a top plan view of the charging station of FIG. 35.

FIG. 37 is an enlarged fragmented view taken along line 37 in FIG. 36.

FIG. 38 is a front elevational view of the charging station of FIGS. 35 to 37.

FIG. 39 is a cross-sectional view taken along line 39-39 in FIG. 38.

FIG. 40 is an enlarged fragmented view taken along line 40 in FIG. 41.

FIG. 41 is a rear perspective view of the charging station of FIGS. 35 to 40.

FIG. 50 is a front elevational view of the station of FIGS. 48 and 49.

FIG. 51 is a left-side elevational view of the station of FIGS. 48 to 50, the right-side elevational view being a mirror image thereof.

FIG. 52 is a top plan view of the station of FIGS. 48 to 51.

FIG. 55 is a front elevational view of the station of FIGS. 53 and 54.

FIG. 56 is a left-side elevational view of the station of FIGS. 53 to 55, the right-side elevational view being a mirror image thereof.

FIG. 57 is a rear elevational view of the station of FIGS. 53 to 56.

FIG. 58 is a bottom plan view of the station of FIGS. 53 to 57.

FIG. 59 is a top plan view of a station for a portable electronic device which is variation of the station of FIGS. 53 to 58, wherein the base is supported within a desktop receptacle for supporting the portable electronic device on a horizontal support surface.

FIG. 60 is a right-side elevational view of the station of FIG. 59, the left-side elevational view being a mirror image thereof.

FIG. 61 is a front elevational view of the station of FIGS. 59 and 60.

FIG. 62 is a bottom plan view of the station of FIGS. 59 to 61.

FIG. 69 is a rear elevational view of the desktop receiver of FIGS. 65 to 68.

FIG. 70 is a cross-section-view similar to FIG. 64 but showing a variation of the system of FIGS. 59 to 69, wherein the base is permanently adhered to the desktop receiver rather than removably supported thereon.

FIG. 71 is a bottom plan view similar to FIG. 68 but showing a variation of the desktop receiver of FIGS. 65 to 69, wherein the desktop receiver is provided with molded-in threaded inserts to secure the desktop receiver to the horizontal support surface rather than suction cups.

Figure 8:
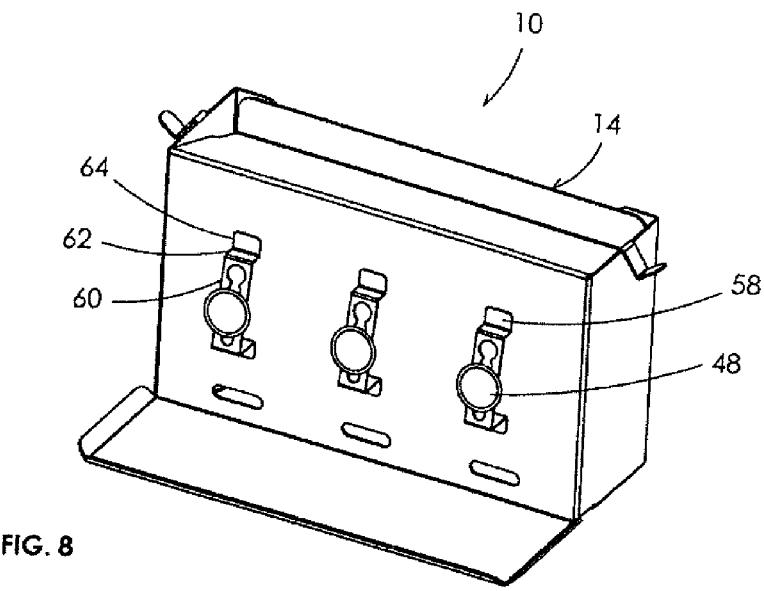
FIG. 8 is a perspective view a variation of the charging station of FIGS. 1 to 7.

It should be understood that the appended drawings are not necessarily to scale, presenting a somewhat simplified representation of various preferred features illustrative of the basic principles of the invention. The specific design features of the charging stations as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the charging stations illustrated in the drawings. In general, up or upward generally refers to an upward direction within the plane of the paper in FIG. 2 and down or downward generally refers to a downward direction within the plane of the paper in FIG. 2. Also in general, front or forward generally refers to a leftward direction within the plane of the paper in FIG. 2 and rear or rearward generally refers to a rightward direction within the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the charging stations disclosed herein. The following detailed discussion of various alternative and preferred embodiments will illustrate the general principles of the invention. Other embodiments suitable for other applications will be apparent to those skilled in the art given the benefit of this disclosure.

Referring now to the drawings, FIGS. 1 to 7 show a charging station 10 for a portable electronic device 12 according to a first embodiment of the present invention. The illustrated charging station 10 includes a body or base 14 having a substantially vertical and forward-facing front wall 16 and a plurality of forward-facing fasteners 18 on the wall 16 so that the fasteners 18 can temporarily secure the portable electronic devices 12 to the wall 16 in a position that the portable electronic device can be viewed and operated while recharging. The fastener 18 is temporarily secured to the back of the portable electronic device 12 so that the portable electronic device 12 is held in a substantially vertical and forward-facing orientation so that it can be easily viewed and used while recharging and can be easily removed from the fastener 18 when recharging is complete. The illustrated fasteners 18 secure the portable electronic devices 12 against movement in three of the four primary directions within the plane of the front wall 16 (both lateral directions and the downward direction) and in both directions perpendicular to the front wall 16 but permits full 360 degree rotation about an axis perpendicular to the front wall 16. The fastener 18 limits movement of the portable electronic device 12 so that the portable electronic device 12 can be operated with one hand, that is, it is not necessary to hold or stabilize the portable electronic device 12 with one hand while operating it with the other hand. The fastener 18 permits rotation so that the portable electronic device 12 can be moved between portrait landscape orientations. The term "portable electronic device" is used in the specification and claims to mean a handheld electronic device that utilizes rechargeable batteries as a power source including, but not limited to, telephones, personal digital assistants (PDAs), digital cameras, mp3 players, video game players, messaging systems, video players, portable televisions such as LCD televisions, tablet computers, and the like.

The illustrated base 14 includes the vertically-extending and forward-facing front wall 16, vertically-extending and laterally-facing left and right side walls 20, 22 that rearwardly extend from opposed lateral edges of the front wall 16, an inclined top wall 24 rearwardly-extending from a top edge of the front wall 16, and a horizontally-extending and upward-facing base wall 26 that forwardly extends from a bottom edge of the front wall 16. The illustrated front wall 16 is vertically-extending but it is noted that the front wall 16 can alternatively be slightly angled or substantially vertical.

The term "substantially vertical" is used in this specification and claims to mean that the front wall 16 is no more than 45 degrees from vertical so that the portable electronic device 12 secured thereto is substantially vertical and can be easily used and viewed while recharging. The illustrated side walls 20, 22 each include a vertically-extending and rearward-facing back flange 28 that perpendicularly extends from a rear edge of the side wall 20, 22 and a horizontally-extending and downward-facing bottom flange 30 that perpendicularly extends from a bottom edge of the side wall 20, 22. The illustrated side walls 20, 22 are also each provided with hooks 32 laterally-extending from the top edge of the side walls 20, 22. The hooks 32 are preferably sized and shaped for temporarily supporting key rings. The illustrated top wall 24 extends the entire length between the side walls 20, 22 and downwardly inclines in a rearward direction. The illustrated top wall 24 is provided with a vertically-extending and rearward-facing back flange 34 that extends from a rear edge of the top wall 24. The top wall 24 is sized and shaped to support items such as, for example, the illustrated envelopes or other mail, portable electronic devices and their accessories, other personal items, and the like.

As best shown in FIGS. 5 and 6, the back flange 34 of the top wall 24 is forwardly spaced from the back flanges 28 of the side walls 20, 22 to form a space or gap 36 therebetween. The gap 36 is preferably sized for extending power cords or cables through the gap to personal electronic devices located on the top wall 24. The illustrated base wall 26 is provided with front and side flanges 38, 40 that upwardly incline from front and side edges of the base wall 26 respectively. The base wall flanges 38, 40 are sized and shaped to assist retaining any items lying on the base wall 26 such as, for example, portable electronic devices 12 and their accessories, and the like.

A pair of key-shaped openings 42 is provided on the back flanges 28 of the side walls 20, 22 for securing the base 14 to a wall or other vertically-extending support surface. The illustrated key shaped openings 42 are sized for cooperating with #8 size screws but any other suitable size and shape can alternatively be utilized. The illustrated key-shaped openings 42 are oriented in the same lateral direction so that horizontal movement of the base 14 is required for mounting and removal of the base 14 to the wall. It is noted that any other suitable location and/or shape of mounting openings 42 can alternatively be utilized. A plurality of feet 44 is provided on the bottom of the base wall 26 and the side wall bottom flanges 30. The feet 44 are sized, shaped and positioned so that the base 14 can rest in a stable position on top of a horizontal support surface such as a desktop, kitchen countertop, night stand, or the like. It is noted that any other suitable location, quantity, and/or shape of feet 44 can alternatively be utilized. Additionally, double sided suction cups or other suction cups such as suction cups in the form micro-suction tape (described in more detail hereinafter) of can be provided on the bottom of the base 14 to provide a positive connection between the base 14 the supporting surface. This can be particularly helpful when the supporting surface is smooth and slick such as, for example, granite, to prevent the charging station 10 from sliding when operating the portable electronic device 12. Configured in this manner, the base 14 can be alternatively mounted to a wall or supported on a table top as desired by user.

The illustrated front wall 16 is provided with three laterally spaced-apart attachment locations 46 for the portable electronic devices 12. It is noted that a greater or lesser quantity of attachment locations 46 can alternatively be utilized. The illustrated fasteners 18 at the attachment locations 46 are suction cups 48 which can be easily secured to the portable electronic devices 12 with suction or vacuum and easily removed from the portable electronic devices 12 when the suction or vacuum connection is broken. As best shown in FIGS. 2 and 5, the illustrated suction cups 48 each have a cup portion for directly engaging the rear side of the portable electronic device 12, a flange portion for securing the suction cup 48 to the front wall 16, and a throat portion connecting the cup portion to the flange portion that is smaller than both the cup portion and the flange portion. It is noted that any other suitable type of suction cup 48 can alternatively be utilized such as, for example, suction cups in the form of micro-suction tape or the like.

Each illustrated attachment location 46 includes a pair of vertically spaced apart key-shaped openings 50 and a forward-facing suction cup 48 removably secured to one of the openings 50. Each opening 50 has a first or smaller portion 52 sized for preventing passage of the flange of the suction cup 48 therethrough for retaining the suction cup 48 to the front wall 16 and a second or larger portion 54 sized larger than the first portion 52 for passage of the flange therethrough for installation and removal of the suction cup 48 to the front wall 16. To secure the suction cup 48 to the front wall 16, the flange is inserted through the larger portion 54 of the opening 50 and then the throat portion is moved into the smaller portion 52 of the opening 50 so that the flange cannot be withdrawn. The process is reversed to remove the suction cup 48 from the front wall 16. It is noted that the direction for removing the suction cup 48 is different than the direction for removing the fasteners securing the base 14 to the wall. The suction cup 48 can be selectively moved between the two upper and lower openings 50 of the attachment location 46 depending on the desired position for the portable electronic device 12 or the best location to engage the portable electronic device 12. It is noted that a greater or lesser quantity of the openings 50 and/or the suction cups 48 can alternatively be provided at each attachment location 46. For example, both of the openings 50 can be provided with suction cups 48 to provide greater stability for the portable electronic device 12 and/or there can be three of the openings 50 at each or some of the attachment locations to provide more attachment options.

Each illustrated attachment location 16 is also provided with an opening 56 below the key-shaped openings 50 for passage of cables and/or cords therethrough from the base interior to the personal electronic device 12 located at the attachment location or laying on the base wall 26. The illustrated openings 56 are horizontally elongated slots but any other suitable size, shape, and/or quantity can alternatively be utilized.

As shown in FIG. 8, spacers 58 can be provided to position the suction cups 48 further forward of the front wall 16 so that there is a larger gap behind the portable electronic device 12 in order to aid in removing the suction cup 48 from the portable electronic device 12. The illustrated spacers 58 have a vertically-extending main portion 60 in which a the vertically spaced-apart openings 50 are provided in, horizontally-extending spacing portions 62 rearwardly-extending from the upper and lower ends of the main portion 60, and vertically-extending attachment portions 64 upwardly and downwardly-extending from the upper and lower spacing portions 62 respectively. The attachment portions 64 engage and are secured to the front wall 16 in any suitable manner such as, for example, double-sided tape and the like. It is noted that the spacers 58 can alternatively have any other suitable shape and size.

The walls 16, 20, 22 of the illustrated base 14 form an interior space 66 for housing an outlet or wall-plug style surge protector or power adapter 68 and AC/DC converters 70 for supplying power to the portable electric devices 12. The illustrated power adapter 68 includes a grounded plug located at a rear side of the adapter and six grounded receptacles outlets located on lateral sides of the adapter 68. It is noted that any other suitable power adapter 68 can alternatively be utilized. It is also noted that the illustrated power adapter 68 is not secured to the base 14. To recharge/power the portable electronic devices 12, the power adapter 68 is inserted to a wall electrical power outlet or receptacle and the AC/DC converters 70 are inserted into both the power receptacles of the power adapter 68 and the appropriate connectors on the portable electronic devices 12. For portable electronic devices 12 located at the attachment locations 46 or laying on the base wall 26, the cords or cables of the AC/DC converters 70 extend through the openings 56 in the front wall 16. For portable electronic devices 12 lying on the top wall 24, the cords or cables of the AC/DC converters 68 extend through the gap 36 between the top wall 24 and the rear flanges 28 of the side walls 20, 22. The illustrated base 14 is provided with a plurality of cord wraps 72 within the interior space 66 so that excess lengths of the cords or cables can be wound about the cord wraps 72. The illustrated base 14 has four cord wraps 72 that are secured to the interior sides of the side walls 20, 22 and the front wall 16 between the attachment locations 46. The cord wraps 72 can be secured to the walls 16, 20, 22 in any suitable manner. It is noted that any other quantity, type, and/or locations of the cord wraps 72 can alternatively be utilized.

The illustrated base 14 is formed from a suitable sheet metal such as, for example, a steel sheet metal. It is noted, however, that the base 14 can alternatively be manufactured from a different process such as, for example, injection molding and the like and/or a different material such as, for example plastic, wood, and the like.

The illustrated charging station 10 is mounted to a wall over a wall electrical power outlet. Preferably inserts are positioned in the wall above and on opposed sides of the wall outlet. Protruding screws are positioned in the inserts. With the adapter 68 plugged into the wall outlet, the AC/DC converters 70 positioned within the charging station 10 are plugged into the adapter 68 and the base 14 is secured to the wall over the wall outlet and the adapter 68. The base 14 is secured to the wall by inserting the heads of the screws through the large portion of the openings 42 in the back flanges 28 and then moving the base 14 laterally to move the screws into the small portion if the openings 42 so that the screws cannot be withdrawn. With the base 14 secured to the wall in this manner, portable electronic devices 12 can be removably secured to the suction cups 48 and connected to the AC/DC adapters 70 so that they can be recharged. To remove the portable electronic devices 12, the portable electronic devices 12 can be removed from the suction cups 48 or the suction cups 48 can be removed from the front wall 16 (with an upward motion in the illustrated embodiment) and then removed from the portable electronic device 12. This second method of removal can be helpful when it is difficult to get a finger behind the portable electronic device 12 to the suction cup to break the vacuum. Mounted in this position, the portable electronic devices 12 are positioned so that they can be easily used while recharging. Portable electronic devices 12 can alternatively be laid on the base wall 26 or the top wall 24 if desired. Additionally, mail can be placed on the top wall 24, keys can be placed on the hooks 32, and personal items can be placed on the base wall 26.

The charging station 10 can alternatively be supported on a table top rather than secured to a wall. FIGS. 9 to 12 illustrate a back cover 74 that can be utilized to substantially close the back opening of the base 14 when the charging station 10 is used in a table top configuration. The illustrated cover 74 has a main portion 76 having a thickness sized so that it can slide down through the gap 36 formed between the back flanges 28 of the side walls 20, 22 and the flange 34 of the top wall 24 (best shown in FIG. 10). A flange portion 78 of the illustrated back cover 74 extends downwardly from the top of the main portion 76 and substantially parallel to the main portion 76 to receive the tops of the side wall back flanges 28 therebetween. The illustrated back cover 74 also is provided with a handle portion 80 centrally located on the flange portion 78 for inserting and removing the back cover 74. An opening 82 is provided in the main portion 76 of the back cover 74 to extend cords or cables to a wall electrical power outlet. It is noted that the adapter 68 can be positioned either at the wall outlet or within the base 14. The illustrated opening 82 is oval shaped but any other suitable shape can be utilized. The illustrated back cover 74 is formed of acrylic but it is noted that any other suitable material can be utilized.

Figure 13:
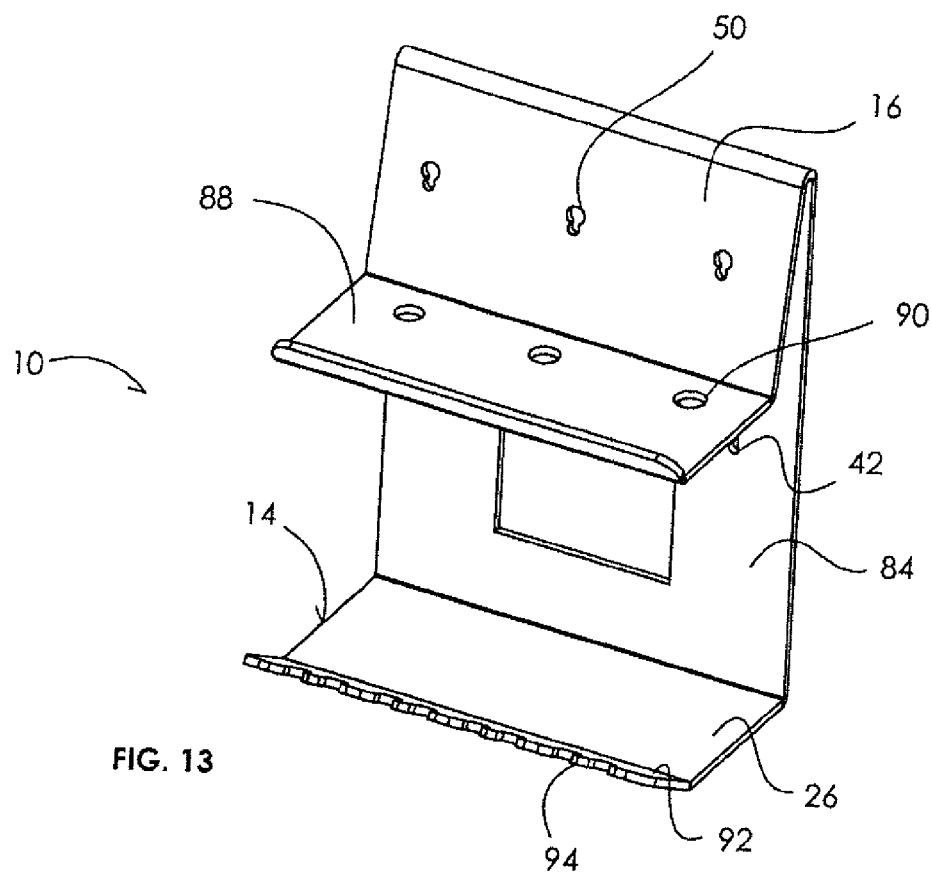
FIG. 13 is a front perspective view of a charging station for portable electronic devices according to a second embodiment of the present invention.

FIG. 13 illustrates a charging station 10 for a portable electronic device 12 according to a second embodiment of the present invention. This embodiment illustrates that the base 14 can take other forms. The illustrated base 14 of this embodiment includes a back wall 84 with an opening 86 for a wall electrical power outlet and key-shaped openings 42 for screws to secure the back wall 84 to a wall. A front wall 16 downwardly extends from the top of the back wall 84 such that it is substantially vertical and is provided with three attachment locations 46 for the portable electronic devices 12. The suction cups 48 are secured the same as described above with regard to the first embodiment of the present invention. A horizontal support wall 88 forwardly extends from the bottom of the front wall 16 and is provided with openings 90 for the passage of cords or cables therethrough. A horizontal base wall 26 forwardly extends from the bottom of the back wall 84 and is provided with a flange 92 forming hooks or mounting points 94 for key rings at its forward end. This embodiment also illustrates that the base 14 can be formed of acrylic.

Figure 14:
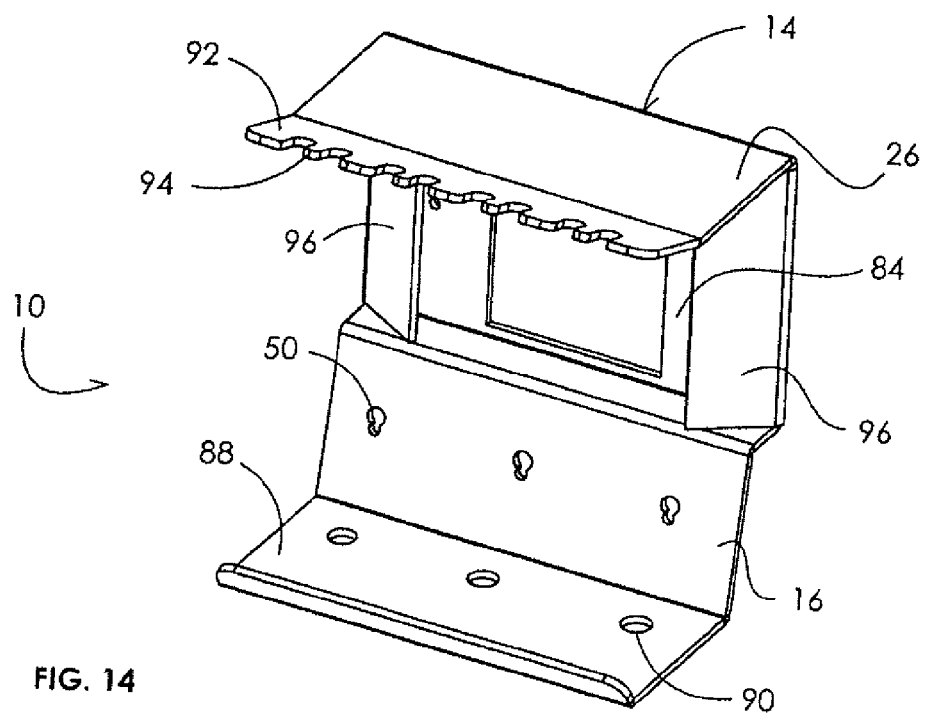
FIG. 14 is a front perspective view of a charging station for portable electronic devices according to a third embodiment of the present invention.

FIG. 14 illustrates a charging station 10 for a portable electronic device 12 according to a third embodiment of the present invention. This embodiment further illustrates that the base 14 can take other forms. This base 14 is substantially the same as to the base 14 of the second embodiment described above except that the front wall 16 and the base wall 26 are reversed so that the base wall 26 extends from the top of the back wall 84 and the front wall 16 extends from the bottom of the back wall 84. This embodiment also illustrates that additional walls can be provided to more fully conceal the adapter. The illustrated base 14 has a pair of side walls 96 inwardly angling from sides of the back wall 84.

Figure 15:
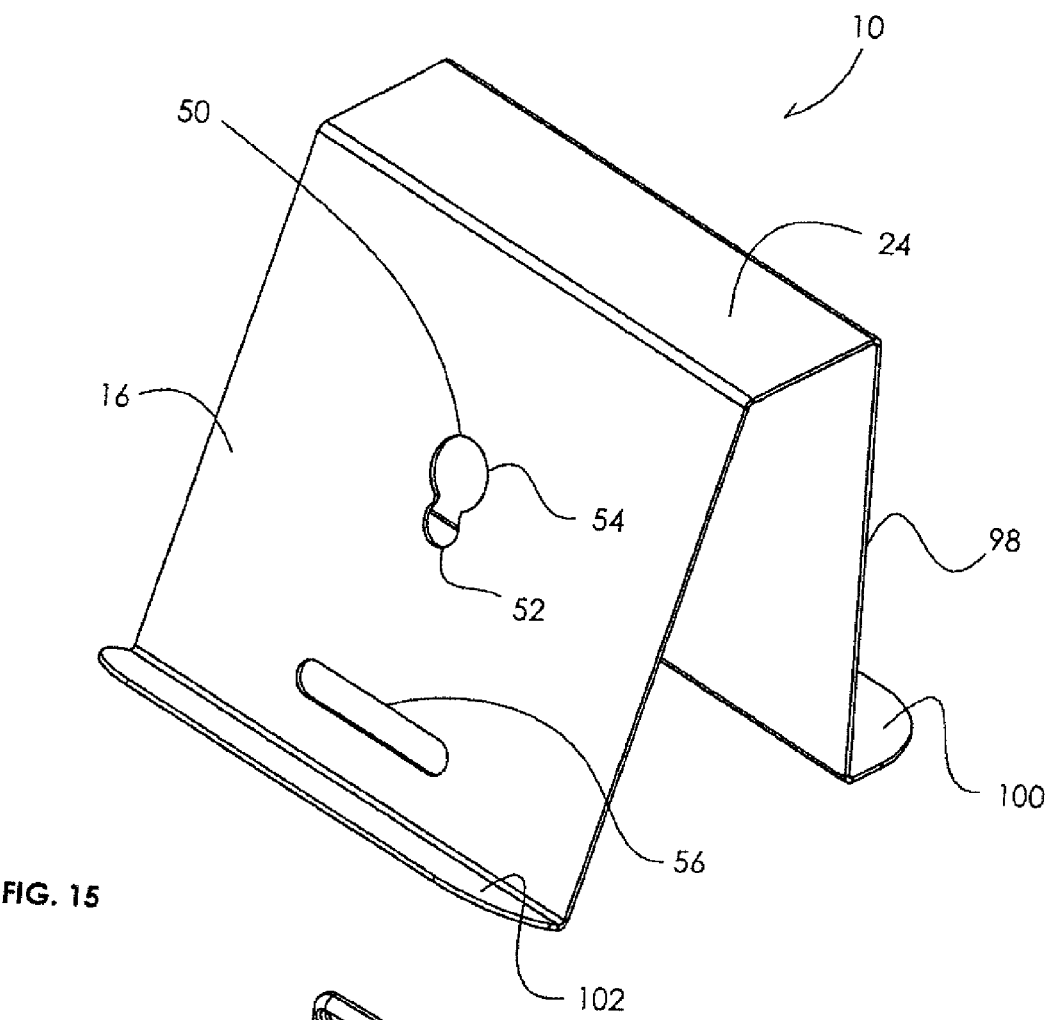
FIG. 15 is a front perspective view of a charging station for portable electronic devices according to a fourth embodiment of the present invention.

FIG. 15 illustrates a charging station 10 for a portable electronic device 12 according to a fourth embodiment of the present invention. This embodiment further illustrates that the base 14 can take other forms. The illustrated base 14 is formed for use on a table top and has a substantially horizontal top wall 24, a substantially vertical back 98 wall downwardly-extending from the rear of the top wall 26 and provided with a rearwardly-extending horizontal flange 100 at its lower end, and a substantially vertical front wall 16 downwardly-extending from the front of the top wall 26 and provided with a forwardly-extending horizontal flange 102 at its lower end. The term "substantially vertical" is used to mean that the front wall 16 is no more than 45 degrees from vertical so that the portable electronic device 12 secured thereto can be easily used while recharging. The front wall 16 is provided with a single attachment location 46 for the portable electronic device 12 having a single opening 50 for the suction cup 48. The suction cup 48 is secured the same as described above with regard to the prior embodiments of the present invention. The front wall 16 and is provided with an opening 56 below the suction cup 48 for the passage of a cord or cable therethrough. This embodiment also further illustrates that the base 14 can be formed of acrylic. It is noted that this embodiment of the configuration enables a portable electronic device 12 to be supported on a nightstand and used as an alarm clock.

Figure 16:
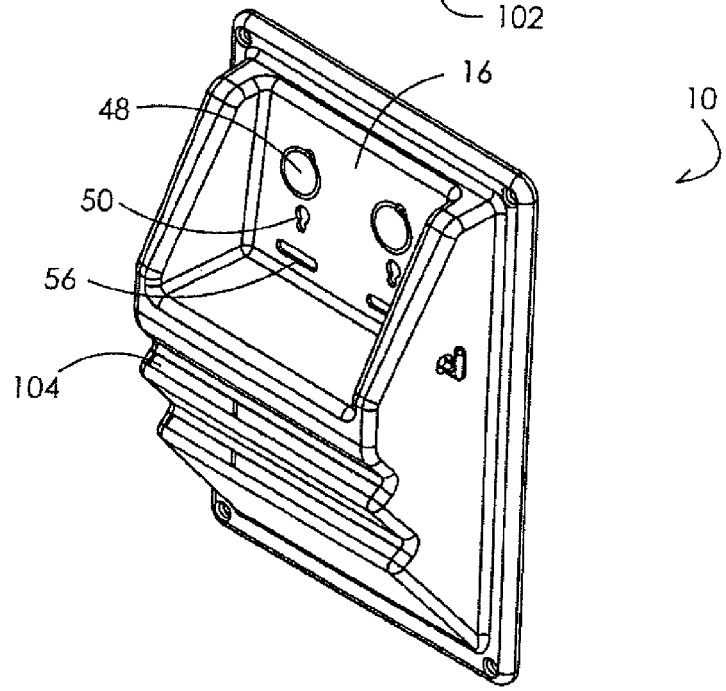
FIG. 16 is a front perspective view of a charging station for portable electronic devices according to a fifth embodiment of the present invention.

FIG. 16 illustrates a charging station 10 for a portable electronic device 12 according to a fifth embodiment of the present invention. This embodiment further illustrates that the base 14 can take other forms and that the base 14 can be molded of a plastic. The illustrated base 14 forms a hollow interior for mounting over a wall electrical power outlet and includes a plurality of slots 104 for storing mail such as, for example, envelopes.

FIGS. 17 to 26 illustrate a variation of the charging station 10 of FIGS. 1 to 12. This variation of the charging station 10 is substantially the same except as described hereinbelow. This charging station 10 is provided with bottom supports or cradles 106 secured to the front wall 16 below the suction cups 48. The bottom supports 106 can limit downward movement of the portable electronic devices 12 if connections with the suction cup 48 inadvertently break or to provide additional support for the portable electronic device 12 when attached to the suction cup 48. The bottom support 106 is particularly desirable in this regard when a user expects to leave a portable electronic device 12 secured to the suction cup 48 for an extended period of time or the user desires a "peace of mind" that the portable electronic device 12 will not accidentally fall. The bottom support 106 can also be useful to establish the suction cup height relative to the bottom of the portable electronic device 12. For example, if a portable electronic device 12 has a specific area which must be secured to the suction cup 48 (because portions of the portable electronic device 12 are unsuitable for an adequate connection with the suction cup 48), the bottom support 106 can be positioned to align the desired area with the suction cup 48 when the portable electronic device 12 is resting on the bottom support 106. Thus, the portable electronic device 12 can be easily secured to the suction cup 48 by first resting the portable electronic device 12 on the bottom support 106 and then rearwardly moving the portable electronic device 12 to engage the suction cup 48 thereto.

The illustrated bottom support 106 has a rear wall 108 for connection to the front wall 16 of the base 14 and a pair of laterally spaced-apart flanges 110 forwardly-extending from the bottom edge of the rear wall 108. The flanges 110 have a horizontal bottom portion forwardly-extending from the bottom edge of the rear wall 108 and a substantially vertical front portion 112 upwardly-extending from a forward edge of the bottom portion 110. The illustrated flanges 110 are sized and shaped so that they limit downward movement of the portable electronic device 12 but do not limit or prevent movement in the upward or lateral directions. Movement in the upward and lateral directions is prevented by the suction cup or cups 48. It is noted that the bottom support 106 can alternatively have any other suitable configuration such as, for example, there can be a single but wider flange 110 and/or the front portions 112 of the flanges 110 can be eliminated. The bottom support 106 can be secured to the base 14 using Command Strips available from the 3M Co., Dual Lock fasteners available from the 3M Co., hook and loop fastener, adhesive, double sided pressure-sensitive adhesive tape, mechanical fasteners, or any other suitable fastening means. It is noted that when the bottom supports 106 are secured by magnets, suction cups, or the like, they can be easily reconfigured by the user by moving them to desired locations on the front wall 16 at any time. The bottom support 106 can be formed of metal, plastic, wood and/or any other suitable material. The illustrated front portions 112 are provided with soft plastic caps 114 to ensure that the bottom support 106 does not scratch or otherwise damage the portable electronic device 12.

As best shown in FIG. 19, the back flanges 28 of the base side walls 20, 22 are provided with an additional pair of key-hole shaped openings 42 for securing the base 14 to the wall. The illustrated base 14 has two pairs of openings 42 but any other suitable quantity of openings 42 can alternatively be utilized. The openings 42 are preferably oriented in the same direction so that additional fasteners can be used to secure the base 14 to the wall to obtain additional rigidity if desired.

Figure 20:
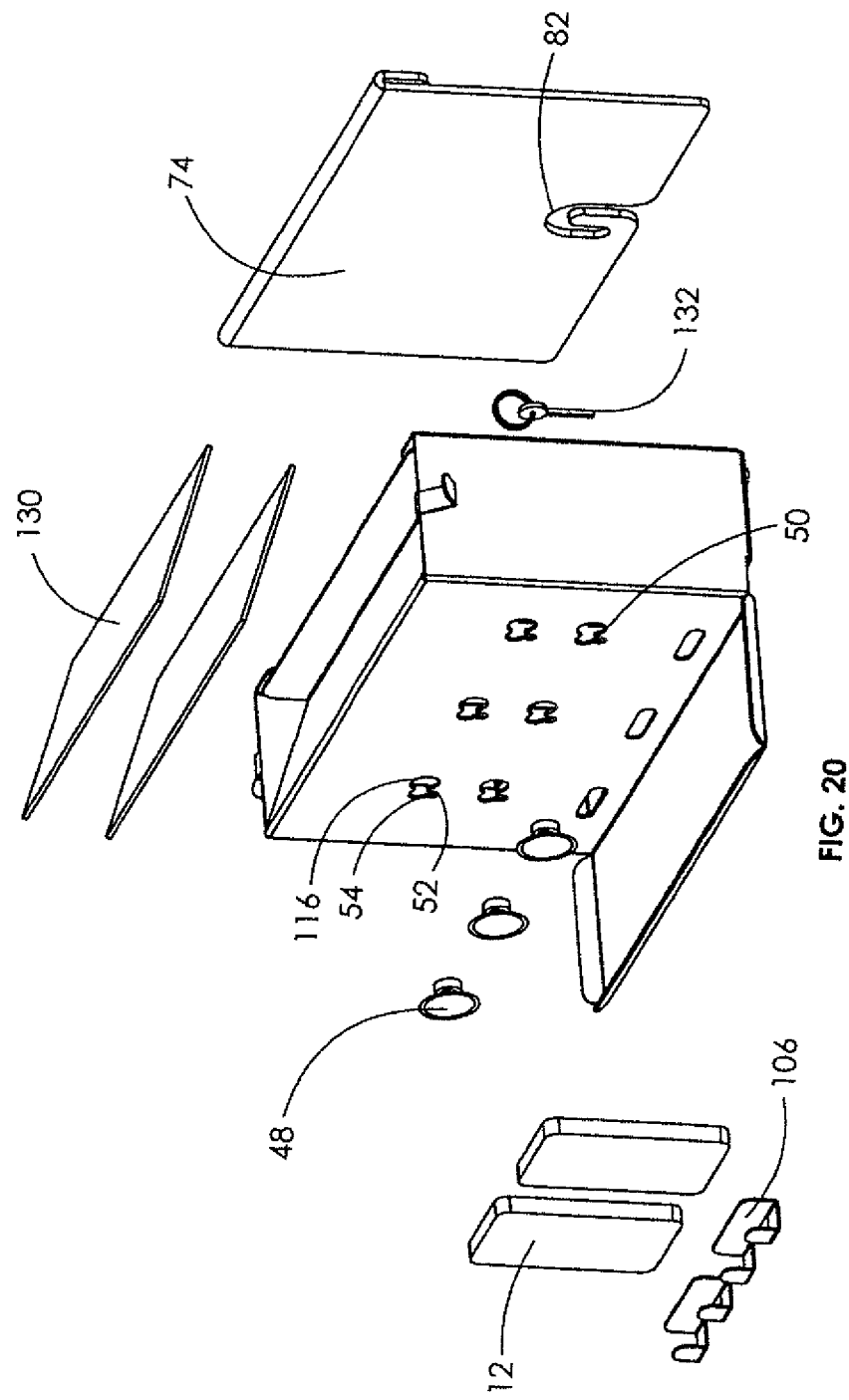
FIG. 20 is a partially exploded front perspective view similar FIG. 12 but showing the station with the bottom supports of FIGS. 17 and 18.

As best shown in FIGS. 19 and 20, the opening 82 in the rear cover 74 for the wires or cords is an inverted J-shaped path which opens into the bottom edge of the back cover 74. Shaped in this manner any portion of the cords or wires can be fed into the opening 82 from the edge of the back cover 74 rather than needing to feed an end of the cords or wires through the closed opening 82. It is noted that the opening 82 can alternatively have any other suitable shape which opens into the bottom edge of the back cover 74.

As best shown in FIG. 20, the openings 50 for securing the suction cups 48 to the front wall 16 are double-key shaped. That is, each of the openings 50 has the first portion 52 sized for preventing passage of a flange of a small suction cup 48 therethrough for retaining the suction cup 48 to the front wall 16, a second portion 52 sized larger than the first portion 50 for passage of the flange of small suction cup 48 therethrough for installation and removal of the small suction cup 48 to the front wall 16 and sized for preventing passage of a flange of larger suction cup 48 therethrough for retaining the larger suction cup 48 to the front wall 16, and third portion 116 sized larger than the second portion 54 for passage of flange of the larger suction cup 48 therethrough for installation and removal of the larger suction cup 48 to the front wall 16. The first, second and third portions 52, 54, 116 of the openings 50 are sized so that a small sized suction cup 48 can be inserted into the intermediate portion 54 and slid downward to the small portion 52 to secure the suction cup 48 to the front wall 16 and so that a large sized suction cup 48 can be inserted into the large portion 116 and slid sideways to the intermediate portion 54 to secure the suction cup 48 to the front wall 16. The portions 52, 54, 116 of the illustrated openings 50 are positioned so that the path for the large suction cups 48 is substantially perpendicular to the path for the small suction cups 48. Note that the direction of removal for each of the suction cups 48 is in a different direction than the openings 42 for attachment of the base 14 to the wall. It is noted that the large suction cups 48 mounted in this manner limit or prevent movement of the portable electronic devices 12 in three of the four primary directions within the plane of the front wall 16 (one lateral directions, the upward direction, and the downward direction) and in both directions perpendicular to the front wall 16 but permits full 360 degree rotation about an axis perpendicular to the front wall 16. The small suctions cups 48 operate the same as discussed above for the single key opening.

These double-keyed openings 50 permit the use of a small or a large suction cup 48 in the same opening 50 depending on the requirements of the portable electronic device 12 rather then using more than one suction cup 48. When using a single suction cup 48, the portable electronic device 12 can be rotated to other orientations as desired such as, for example rotating the portable electronic device 12 to a landscape orientation. The portable electronic device 12 can also be easily rotated to pull the portable electronic device 12 out of the suction cup opening 50 if the battery cover of the portable electronic device 12 is removed in the vertical axis. The user can also use two suction cups 48 (any combination of small and large suction cups 48) if redundancy and/or more rigidity is desired.

Figure 21:
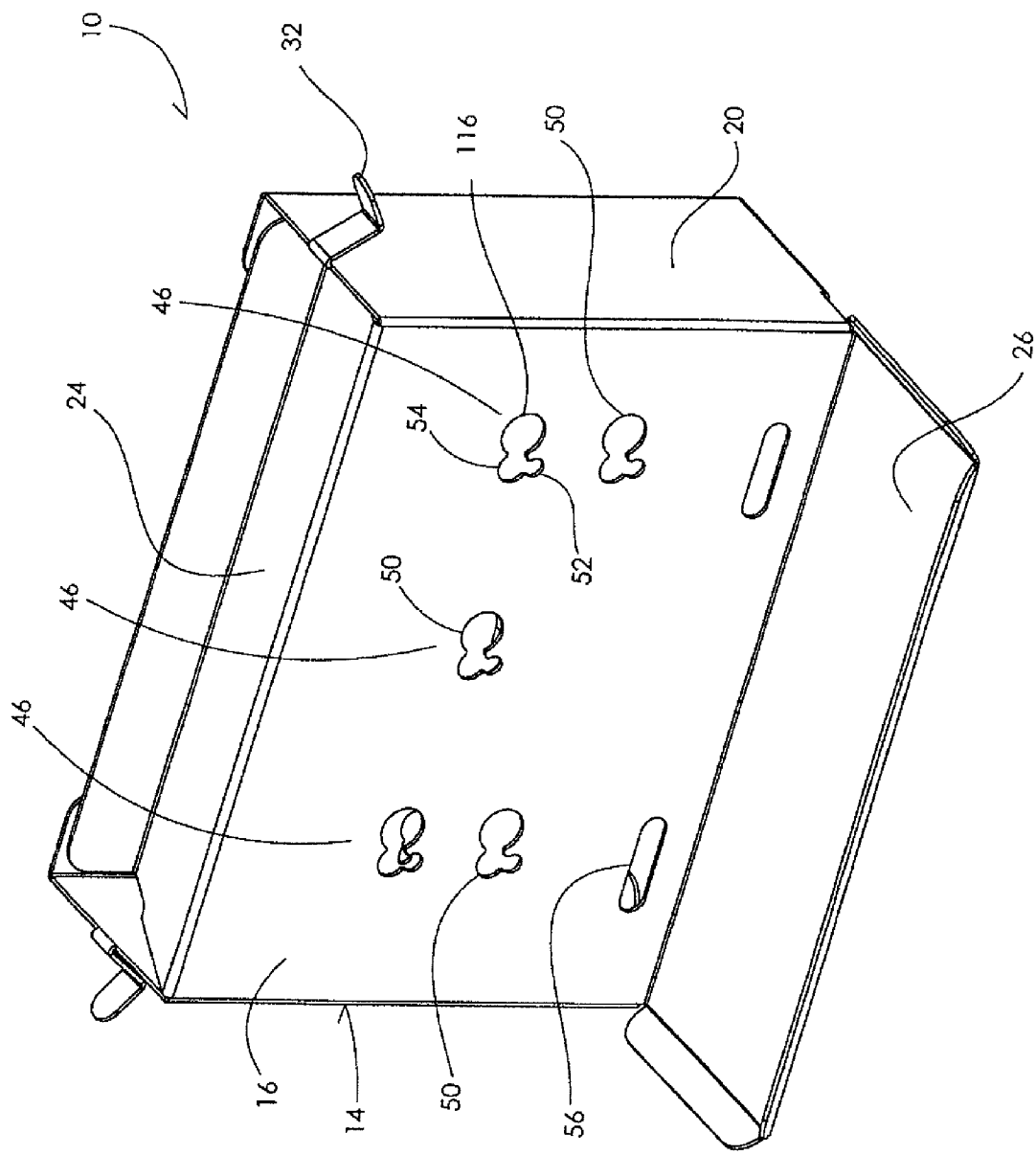
FIG. 21 a front perspective view of a charging station for portable electronic devices according to a sixth embodiment of the present invention, with components removed for clarity.
Figure 22:
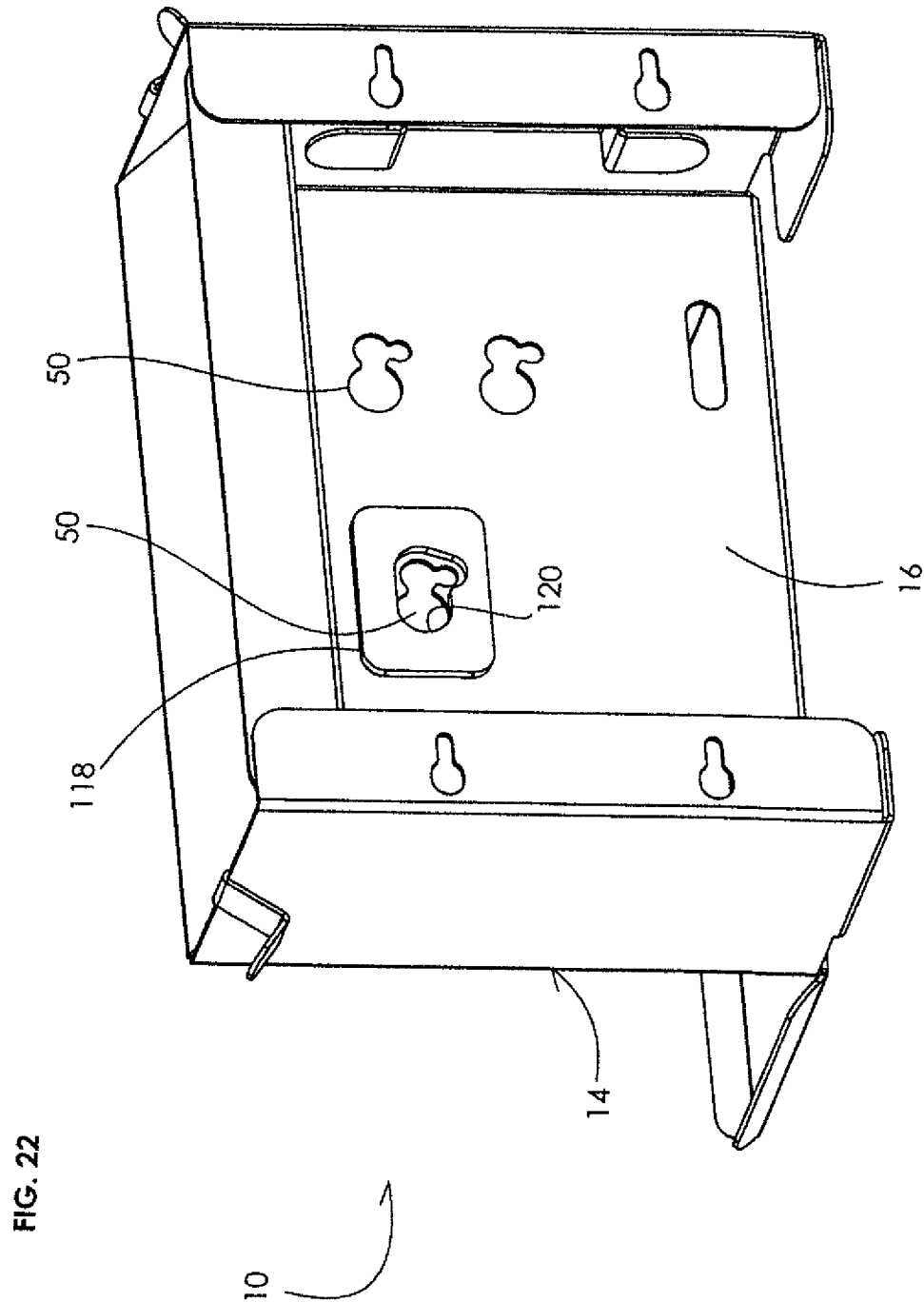
FIG. 22 is a rear perspective view of the charging station of FIG. 21.
Figure 23:
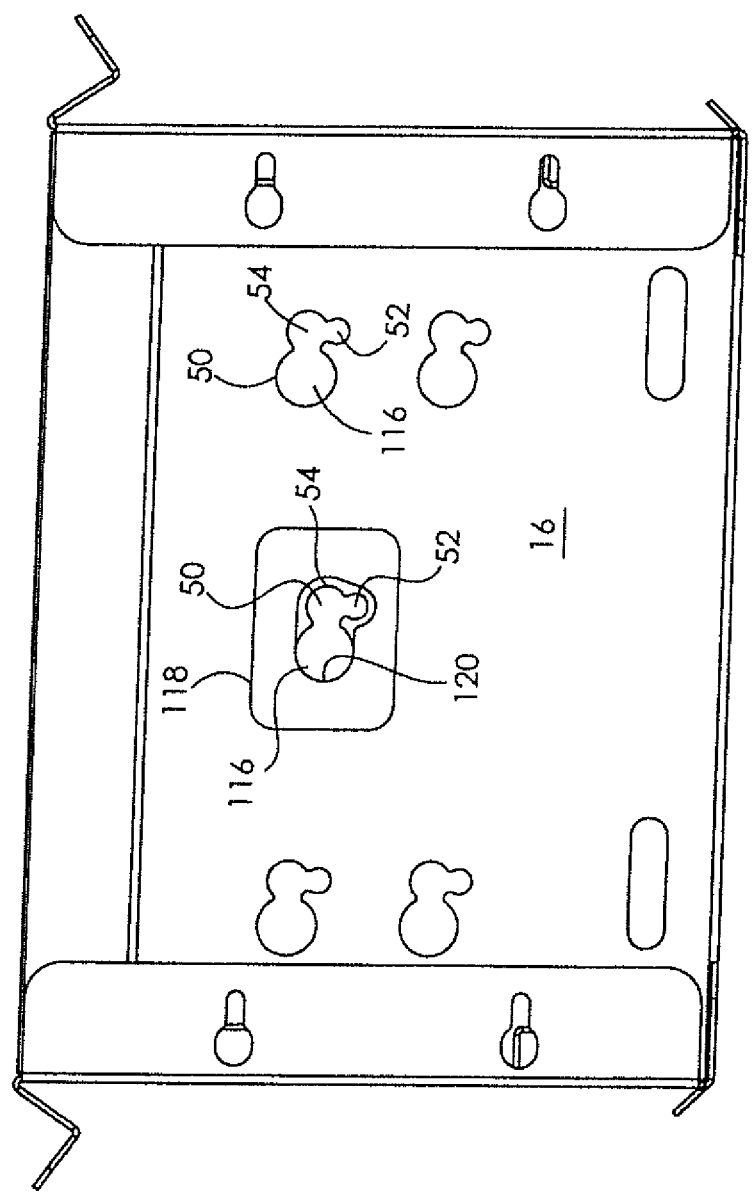
FIG. 23 is a rear elevational view of the charging station of FIGS. 21 and 22.

FIGS. 21 to 23 illustrate a charging station 10 for a portable electronic device 12 according to a sixth embodiment of the present invention. This embodiment further illustrates that the base 14 can take other forms. This embodiment is substantially the same as the first embodiment except that it is sized smaller. This embodiment is sized for holding a tablet computer such as, for example, a iPad available from Apple, Inc., in the landscape position or two side-by-side smart phones such as, for example, an iPhone available from Apple, Inc. There is a centrally located attachment location 46 having a single opening 50 which is useful for securing a large suction cup 48 for the tablet computer. There are also attachment locations 46 on opposed sides of the central attachment location that each have a pair of vertically spaced-apart openings 50 which are useful for securing small suction cups 48 for the smart phones.

The illustrated central opening 50 is provided with a stop plate 118 on the rear side of the front wall 16. The stop plate 118 provides an abutment along a portion of the opening 50 so that the flange of the suction cup 48 does not engage the rear side of the front wall 16 when it is to be withdrawn from the opening 50. As the suction cup 48 is laterally moved from the second or intermediate portion 54 to the third portion 116 for withdrawal, the flange engages the stop plate 118 and deforms rather than moving behind the front wall 16 along the edge of the third portion 116. With the suction cup flange deflected in this manner, it is easier to withdraw the suction cup 48. The illustrated stop plate 118 encircles the entire opening 50 but only closely follows the side of the third portion 116 opposite the second portion 54 and does not affect the flange when in the other sections 52, 54 of the opening 50. The illustrated stop plate 118 follows about half of the third section 116 of the opening 50. It is noted that the stop plate 118 can have any other suitable form to provide the abutment 120 for deforming a portion of the suction cup flange. The stop plate 118 can be secured to the rear side of the front wall 16 in any suitable manner such as, for example, double sided tape and the like.

FIGS. 31 to 34 illustrate a charging station 10 for a portable electronic device 12 according to another variation of the first embodiment of the present invention. This variation is substantially the same as the first embodiment except that the outlet or wall-plug style surge protector 68 is replaced with a strip-style surge protector 68 to eliminate the need for the base 14 to be installed over a wall electrical power outlet. This permits the charging station 10 to be mounted on any wall or other vertical support surface. The strip-style surge protector or power adapter 68 can be supported within the base 14 on the bottom flanges 30 of the side walls 20, 22 or in any other suitable manner.

Figure 4:
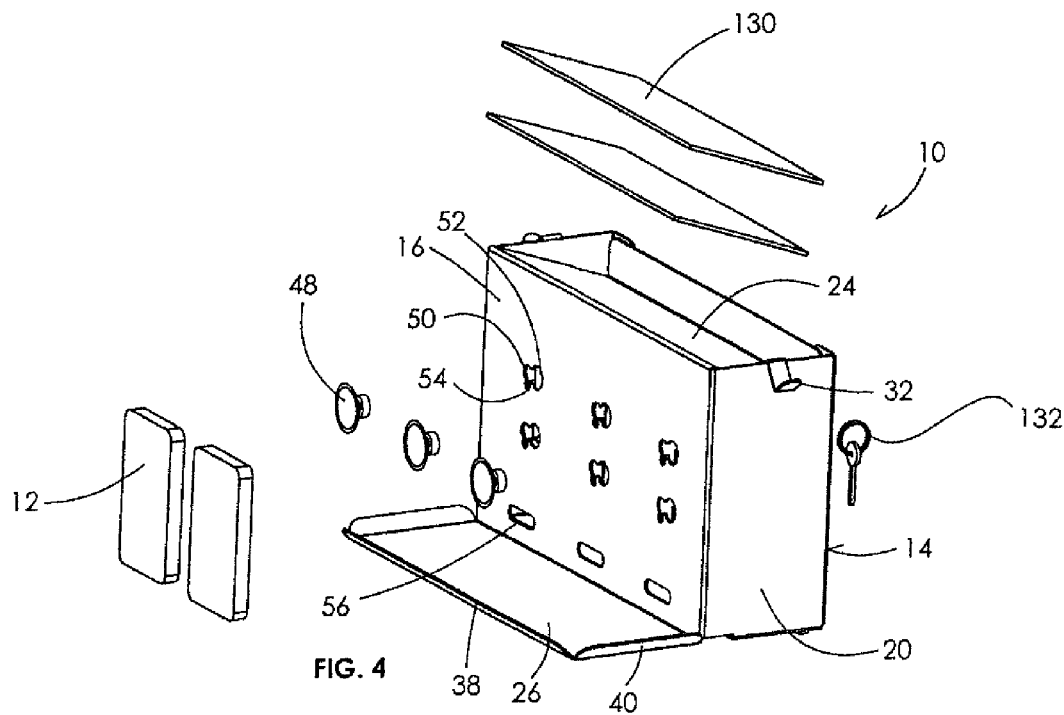
FIG. 4 is a partially exploded front perspective view of the charging station of FIGS. 1 to 3.
Figure 12:
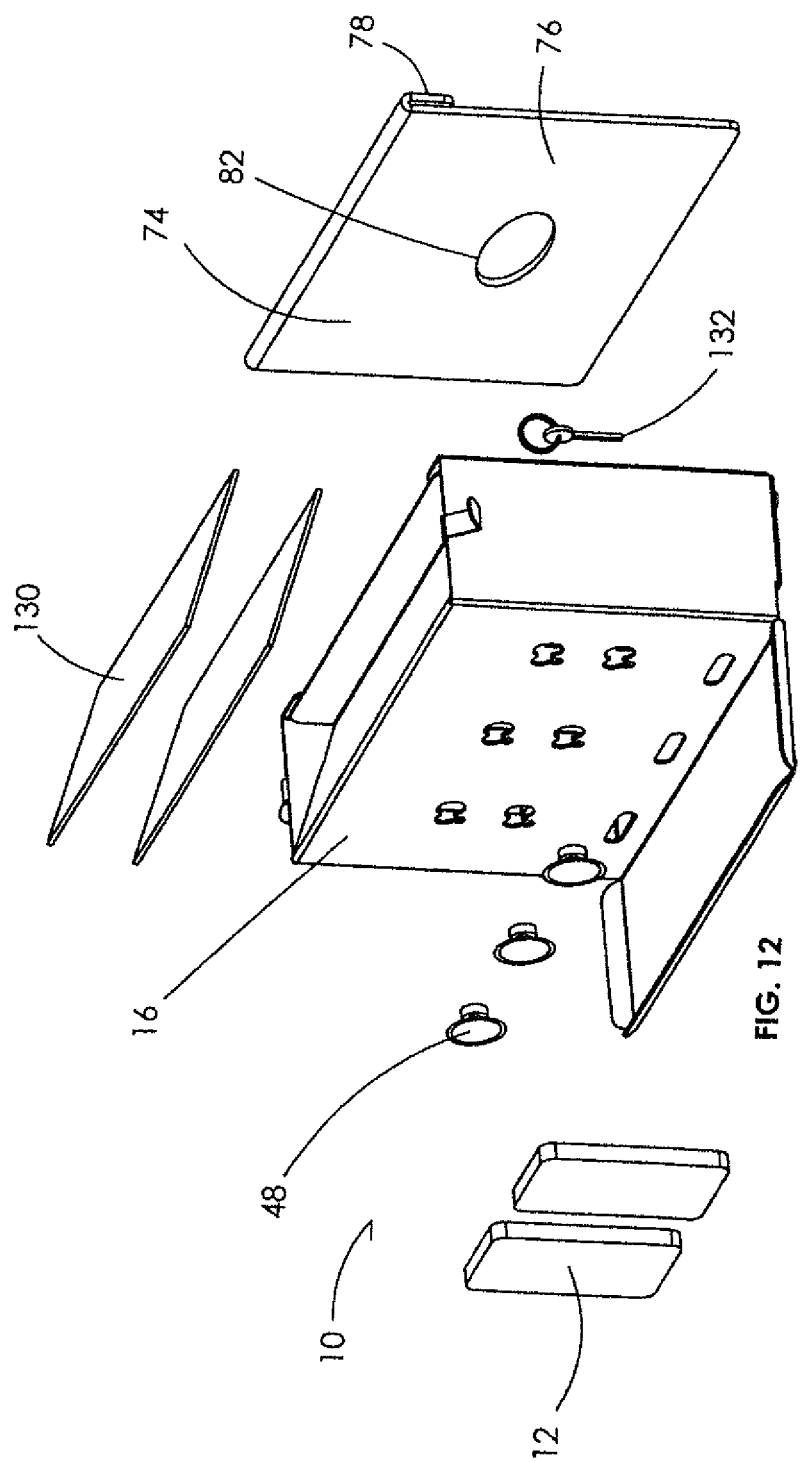
FIG. 12 is a partially exploded front perspective view similar FIG. 4 but showing the station with the rear cover of FIGS. 9 to 11.

FIGS. 35 to 4 illustrate a charging station 10 for a portable electronic device 12 according to a seventh embodiment of the present invention. This embodiment further illustrates that the base 14 can take other forms. This embodiment is substantially the same as the first embodiment except that it is modified to reduce cost. The base wall 26 and the hooks 32 are each eliminated and the base 14 is formed of Acrylic rather than sheet metal. The cable openings 56 are eliminated and wires are routed through the open bottom of the base 14 to the portable electronic devices secured on the front wall 16. The cord wraps or cable management systems 72 are in the form of a cable bundler available from Cablox, Inc. The cable bundler can be cut to the desired size and secured to inner side of the side walls 20, 22 with double sided tape or the like in order to further eliminate welds. A small adhesive cable clip can be mounted on the front bottom center to control the cable going to the middle attachment location 46.

This embodiment also shows that the stop plate 118 can be integrally formed with the front wall 16. The illustrated stop plate is formed by milling a recess in the rear side of the front wall about the opening 50 to form the abutment 120. This version of the stop plate operates in the same manner as described above but eliminates the need for a separate component.

Figure 27:
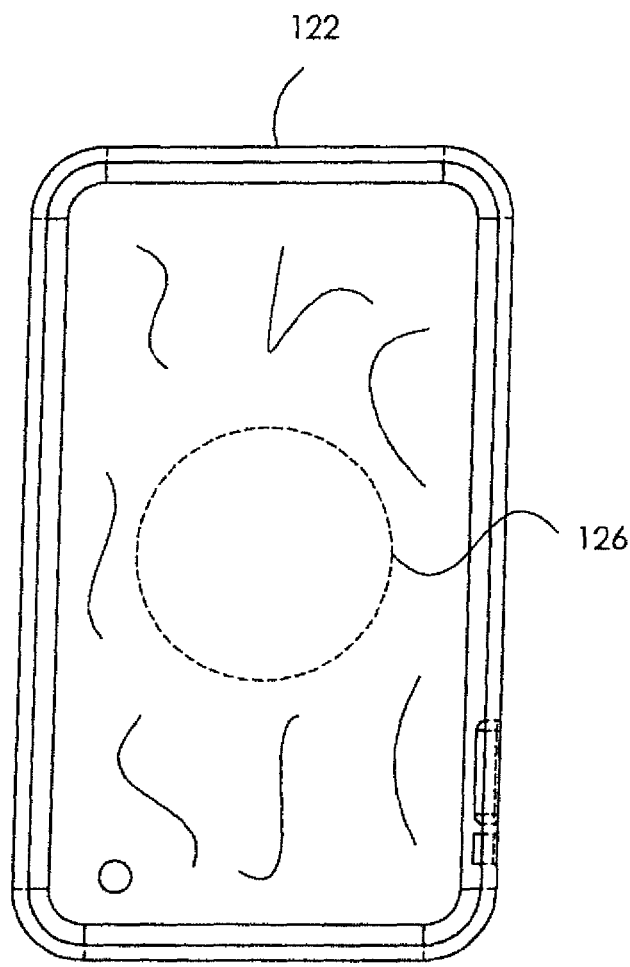
FIG. 27 is a rear elevational view of a sleeve for a portable electronic device which has a plastic puck planar which provides an attachment surface for use with the charging stations of FIGS. 1 to 23.
Figure 28:
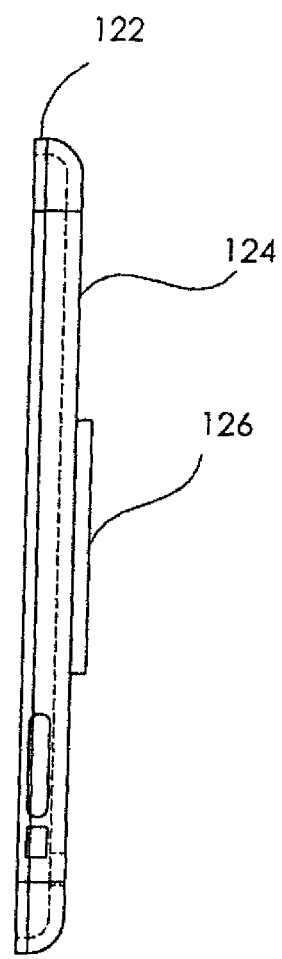
FIG. 28 is a right side elevational view of the sleeve of FIG. 27.

FIGS. 24 to 25 illustrate a sleeve or cover 122 for a portable electronic device 12 in the form of a smart phone such as, for example, an iPhone available from Apple Inc., but the sleeve can be adapted for any other suitable type of portable electronic device 12. The illustrated sleeve 122 easily snaps onto and off of the portable electronic device 12 and provides a hard planar rear surface 124 for attachment of the suction cup 48 thereto. The sleeve 122 is useful when the portable electronic device 122 does not have a rear surface suitable for attachment of the suction cup 48 thereto and/or when the user of the portable electronic device 12 prefers to have a cover or sleeve 122. The illustrated sleeve 122 comprises a relatively hard plastic but any other suitable material can alternatively be utilized. It is noted that the sleeve 122 can alternatively have any other suitable form that provides a suitable attachment surface 124 for the suction cup 48. FIGS. 27 and 28 illustrate a rear surface 124 of a sleeve or cover 122 that is primarily comprised of a material or surface that is unsuitable for attachment of the suction cup 48 but has an attachment puck 126 thereon which forms a suitable hard planar surface for attachment of the suction cup 48. For example, the sleeve 122 can comprise leather with a plastic puck 126 attached thereto or embedded therein. The illustrated puck 126 is circular but the puck 126 can have any other suitable size and/or shape.

Figure 29:
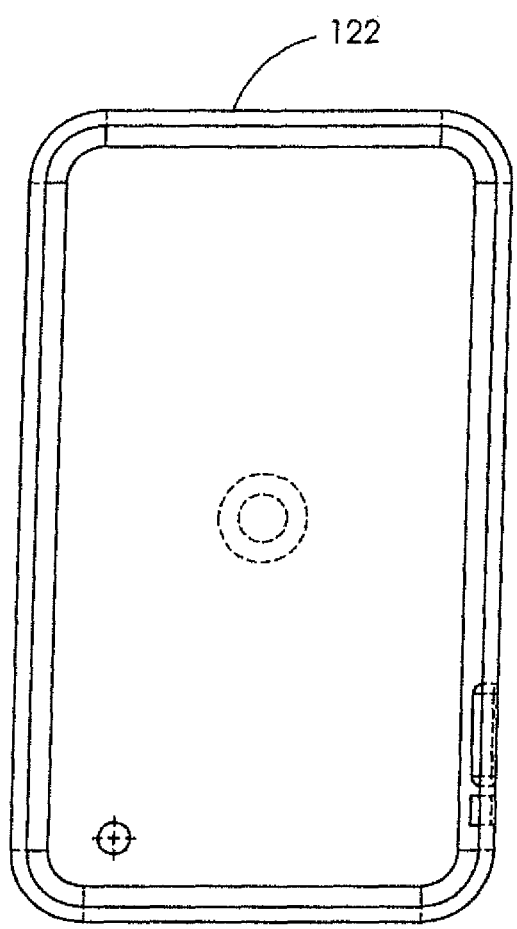
FIG. 29 is a rear elevational view of a sleeve for a portable electronic device which has an alternative fastener in the form of a flanged pin or peg for use with the charging stations of FIGS. 1 to 23.
Figure 30:
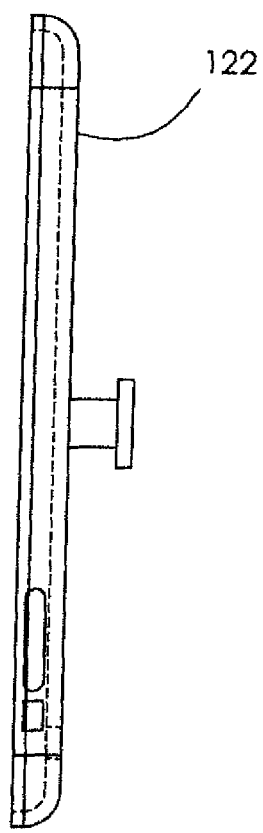
FIG. 30 is a right side elevational view of the sleeve of FIG. 29.
Figure 34:
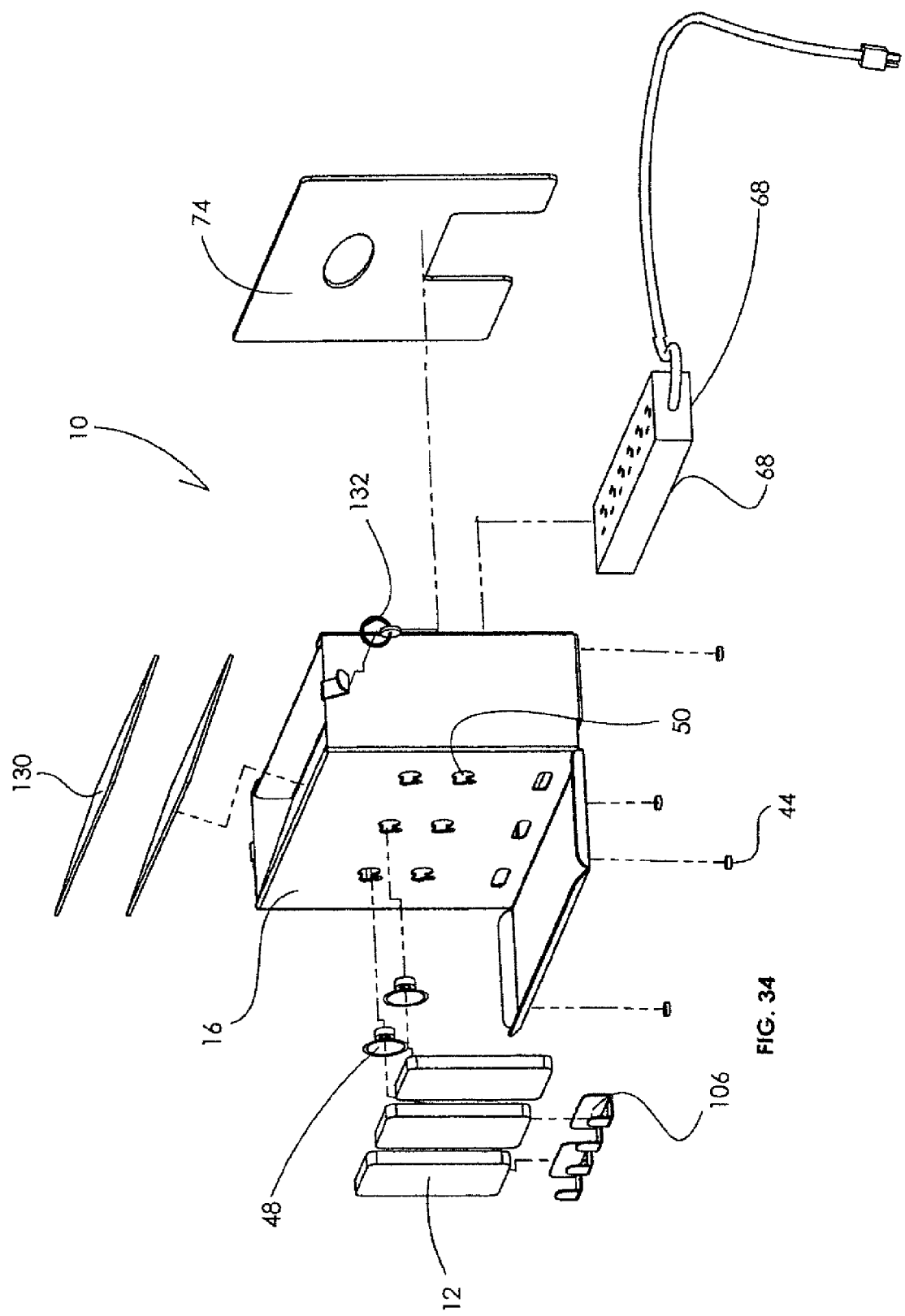
FIG. 34 is a partially exploded front perspective view of the charging station of FIGS. 31 to 33.

The above illustrated removable fasteners 18 comprise the openings 50 and the suction cups 48 but they can be any other suitable removable fastener 18 for temporarily securing the portable electronic devices 12 to the front wall 16 such as for example, hook and loop fasteners, Command Strips available from the 3M Co., and Dual Lock fasteners available from the 3M Co., clips, peg and slot connections, and the like. The suction cups 48, however, are preferred over other removable fasteners that require something to be bonded or otherwise secured to the portable electronic device 12. This can somewhat be avoided by utilizing the sleeve 122 but it is preferred not to be required to utilize the sleeve 122 for all portable electronic devices 12 because some users prefer not to use sleeves or covers 122. FIGS. 28 and 29 illustrate a sleeve 122 having a flanged pin or peg 128 which cooperates with the keyhole openings 50 or the like. It is noted that the peg 128 and the openings 50 can be reversed on the front wall 16 and the sleeve 122 if desired. It is also noted that any other suitable type of removable fastener 18 can alternatively be utilized.

Figure 42:
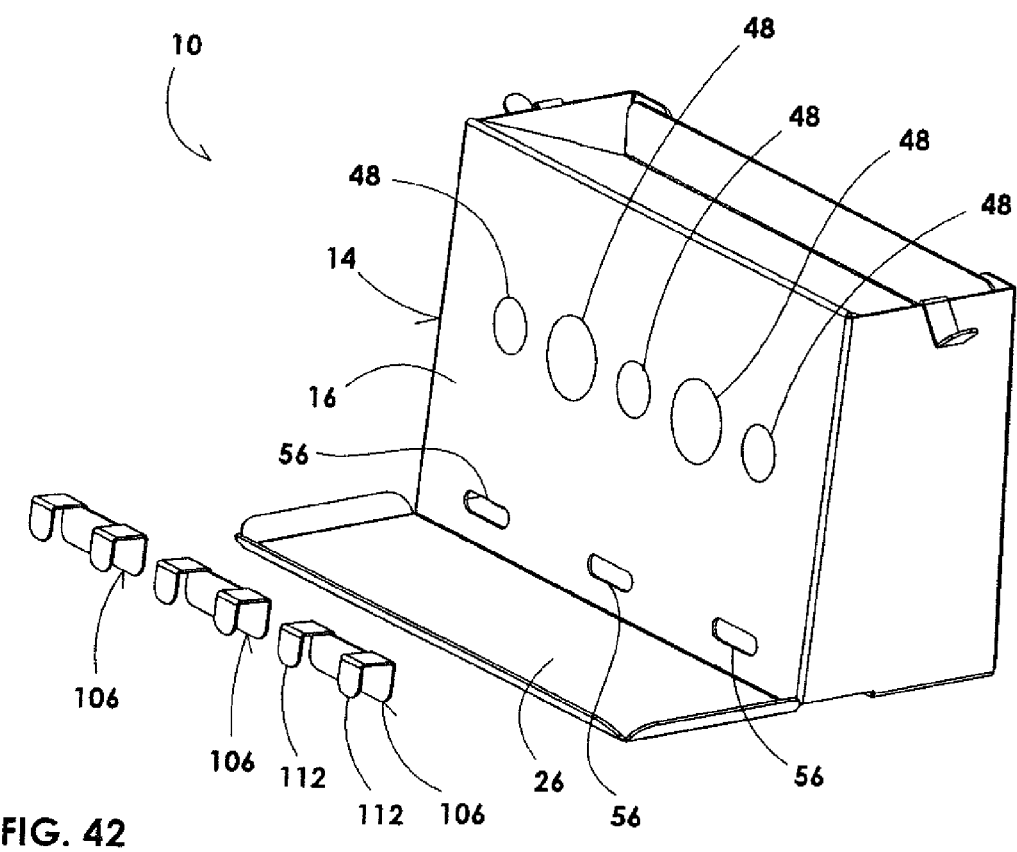
FIG. 42 is a view a front perspective view similar to FIG. 17 but showing the station with the bottom supports for the portable electronic devices flipped over and the suction cups in the form of micro-suction tape.
Figure 43:
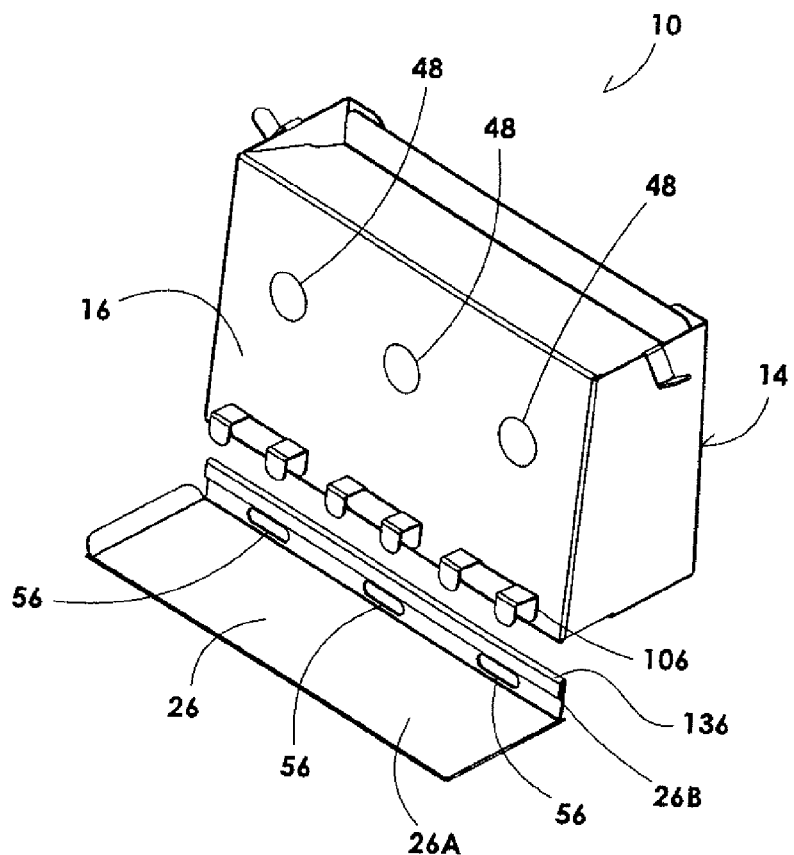
FIG. 43 is a front perspective view similar to FIG. 42 but showing the station with a removable base wall or front tray and the cable openings moved from the front wall to the removable base wall, wherein the removable base wall is removed.
Figure 44:
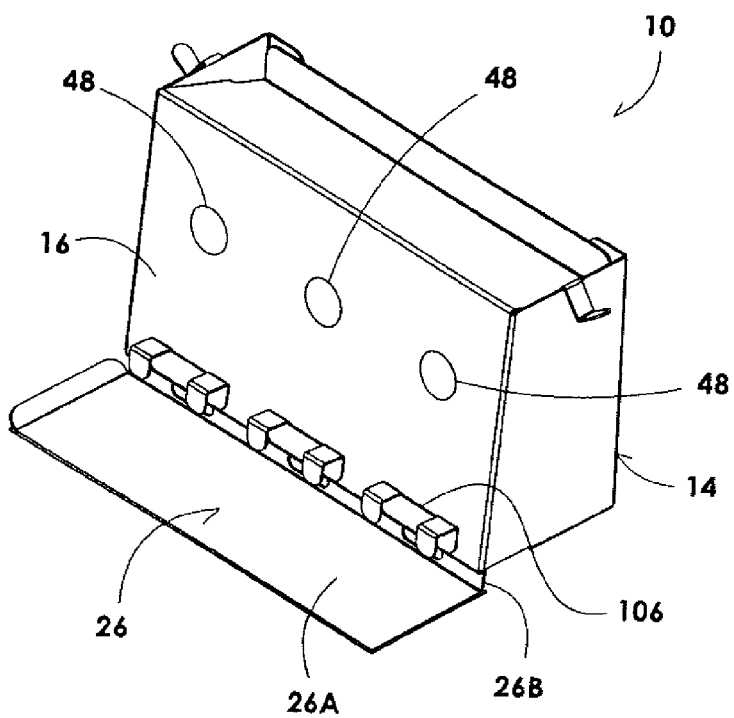
FIG. 44 is a front perspective view of the station of FIG. 43, but wherein the removable base wall is attached.
Figure 45:
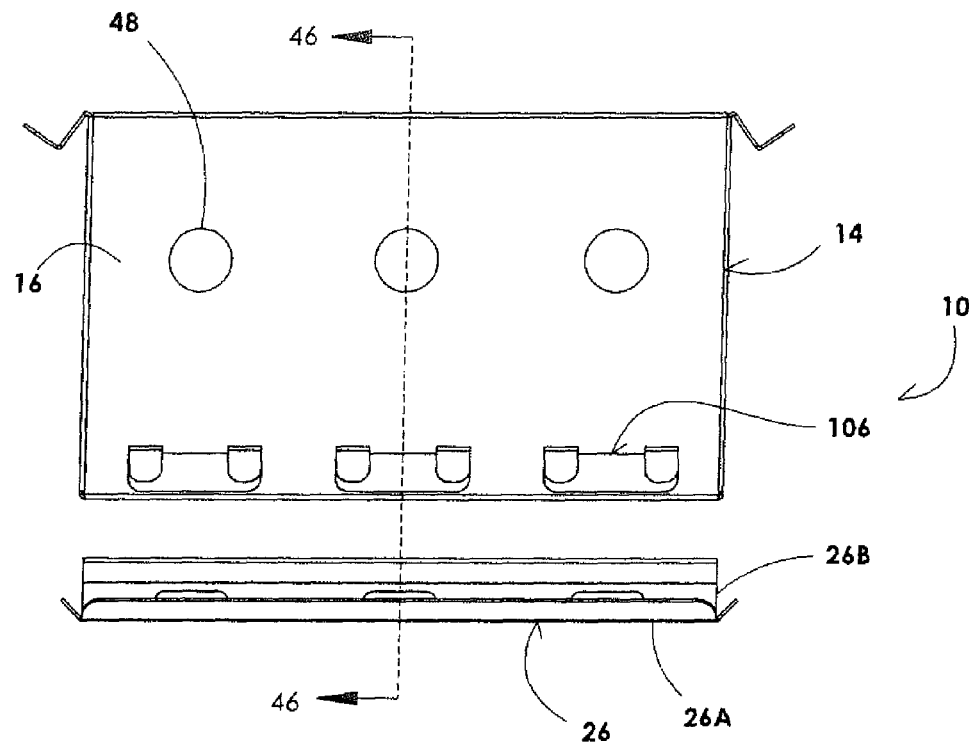
FIG. 45 is a front elevational view of the station of FIG. 42.
Figure 46:
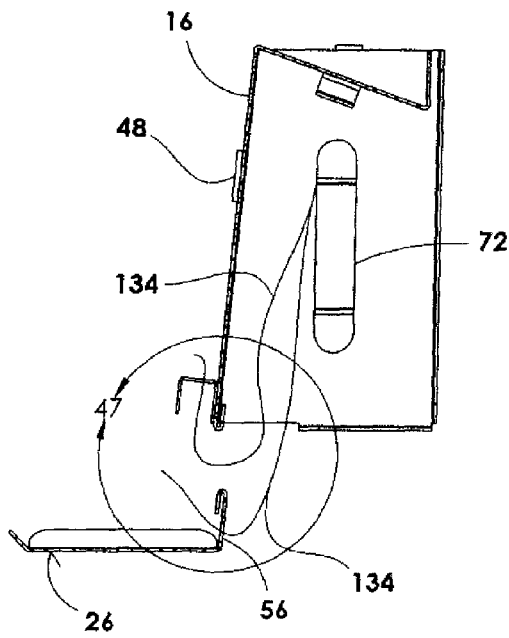
FIG. 46 is a cross-sectional view taken along line 46-46 of FIG. 45
Figure 47:
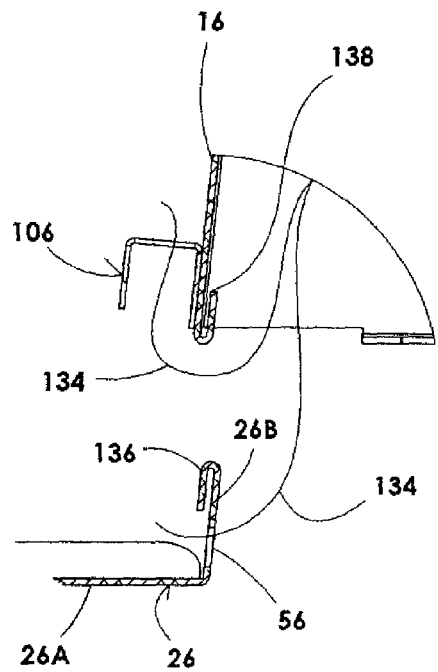
FIG. 47 is an enlarged fragmented taken from line 47 of FIG. 46.
Figure 48:
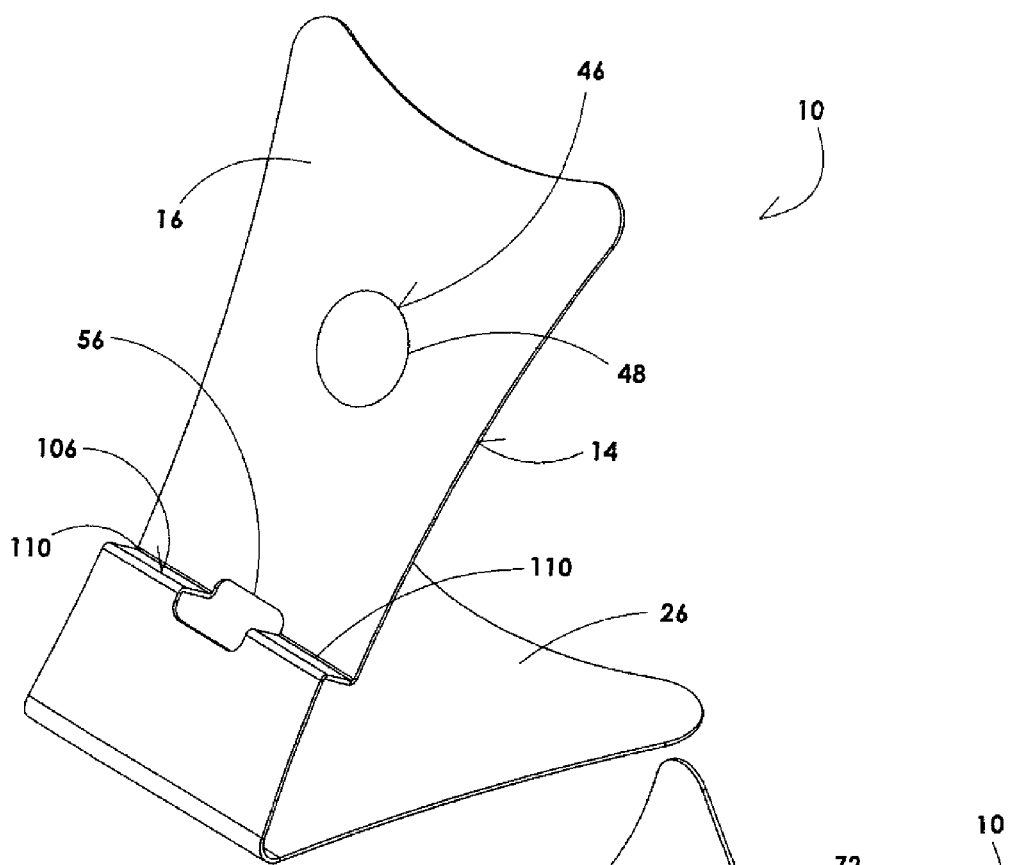
FIG. 48 is a front/top perspective view of a station for a portable electronic device according to an eighth embodiment of the present invention.
Figure 49:
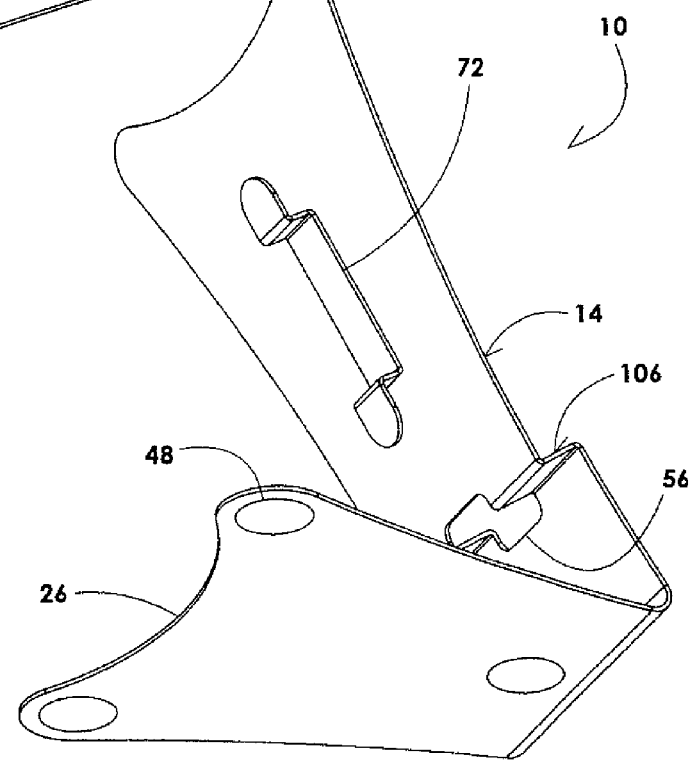
FIG. 49 is a rear/bottom perspective view of the station of FIG. 48
Figure 53:
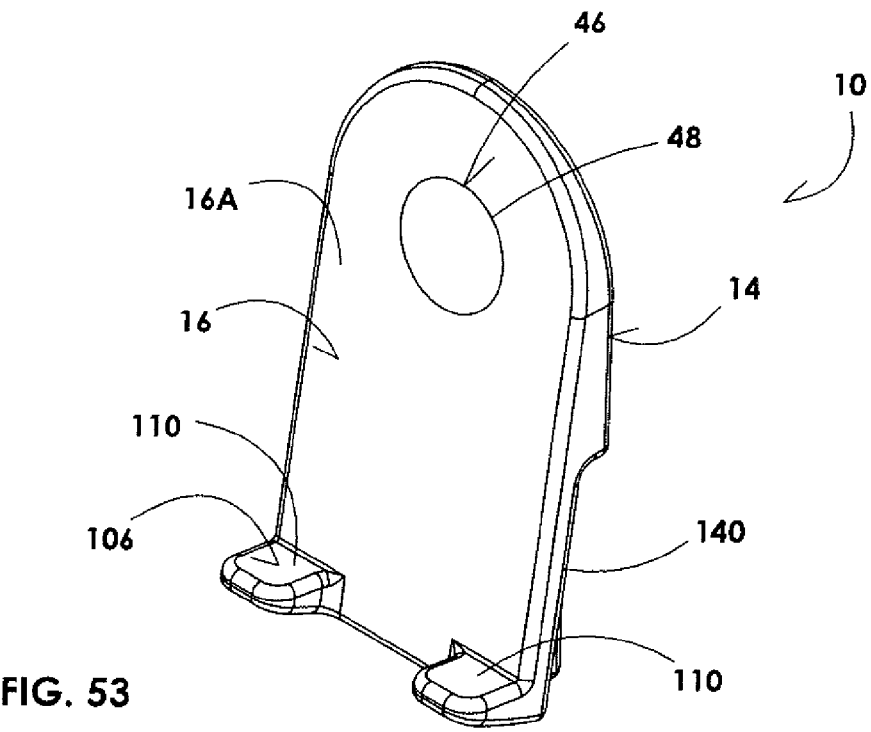
FIG. 53 is a front/top perspective view of a station for a portable electronic device according to a ninth embodiment of the present invention, wherein a base supports the electronic device on a vertical support surface.
Figure 54:
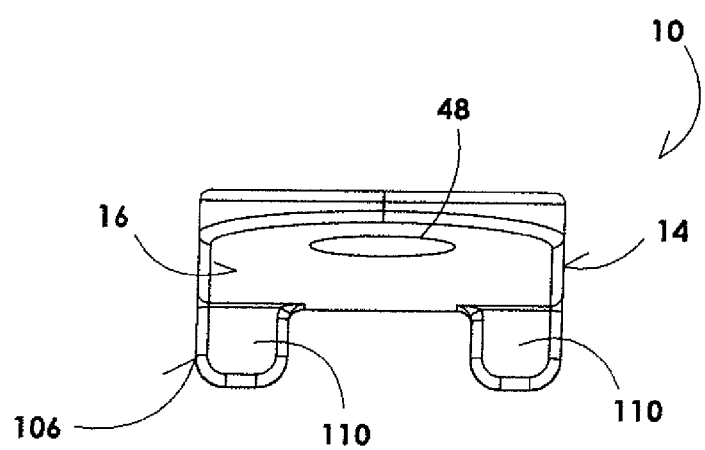
FIG. 54 is a top plan view of the station of FIG. 53.

FIG. 42 illustrates a station 10 for a plurality of portable electronic devices 12 according to another variation of the first embodiment of the present invention. This variation is substantially the same as the first embodiment except that each of the suction cups 48 are in the form of micro-suction tape which removably secure the portable electronic devices 12 to the front wall 16 substantially against movement in each direction within the plane of the front wall 16 and the bottom supports 106 are flipped over so that the front portions 112 are facing downward so the portable electronic devices 12 can more easily be removed from the suction cups 48.

The illustrated suction cups 48 are in the form of a disc of micro-suction tape. It is noted that the illustrated discs of micro-suction tape are circular but they can alternatively have any other suitable shape such as, for example, square, triangular, rectangular, and the like. The discs of micro-suction tape can be of any suitable size to provide a desired holding power for the portable electronic devices 12. The illustrated micro-suction tape is an acrylic foam sheet with thousands of microscopic-sized suction cups on one side and a layer of pressure-sensitive adhesive on the opposite side. The vacuum or suction power of each individual suction cup is weak but is collectively very strong for thousands of the suction cups. Four square inches of micro-suction tape typically holds up to about one pound. The micro-section tape is typically provided with a layer of release paper covering the pressure sensitive adhesive and a layer of protective plastic sheet covering the microscopic-sized suction cups.

The illustrated front wall 16 is provides a flat planar surface for attachment of the suction cups 48 in the form of discs of micro-suction tape. Note that the suction cup openings 50 have been eliminated. The suction cups 48 are attached by first removing the layer of release paper covering the pressure sensitive adhesive so that the adhesive can be adhered to the front wall 16 in a desired location. The layer of protective plastic sheet covering the microscopic-sized suction cups can then be removed so that a portable electronic device 12 can be removably secured to the suction cups 48. The suction cups 48 can be moved and/or replaced at any time by the user wants to reconfigure to different sizes and/or locations of the suction cups. When the bottom supports 106 are secured by magnets, suction cups, or the like, they can also be easily reconfigured by the user by moving them to desired locations on the front wall 16 at any time. Thus, the user can reconfigure the front wall 16 any time it is desired by moving, adding, eliminating, and/or replacing the suction cups 48 and/or the bottom supports 106.

The illustrated bottom supports 106 are flipped over so that the front portions 112 are facing downward. In this configuration, the portable electronic devices 12 can more easily be removed from the suction cups 48 because the front portions will not prevent the portable electronic device from being pulled outward from the front wall 16. When the suction cups 48 are in the form of micro-suction tape, the suction cups 48 cannot rotate and the portable electronic device 12 must be pulled outward over the bottom supports 106. However, the bottom supports 106 still limit downward movement of the portable electronic devices 12 if connections with the suction cups 48 inadvertently break or to provide additional support for the portable electronic device 12 when attached to the suction cups 48. The central opening between the flanges 110 also still permits a cable to downwardly extend from the portable electronic device 12, past the bottom support 106 to the cable opening 56 in the front wall 16.

The illustrated station 10 can be provided as a kit having the base 14, a plurality of bottom supports 112 selectively securable to the front wall 16 of the base 14, and a plurality of suction cups 14 in the form of discs of micro-suction tape selectively securable to the front wall 16 of the base 14. The plurality of suction cups 14 in the form of discs of micro-suction tape can include a plurality of different sizes so that the user can select the amount of holding power to be utilized. The plurality of suction cups 14 could include, for example, two discs having a diameter of about 2.5 inches, two discs having a diameter of about 2 inches, five discs having a diameter of about 1.5 inches, and four discs having a diameter of about 1 inch. It is noted, however, that the kit can alternatively have any other suitable combination of sizes and/or quantities. The kit can alternatively or additionally include a sheet of micro-suction tape so that the user can selectively cut any desired quantity, shape and/or size of discs of micro-suction tape.

FIGS. 43 to 47 illustrate a station 10 for a plurality of portable electronic devices 12 according to another variation of the first embodiment of the present invention. This variation is substantially the same as the variation shown in FIG. 42 except that base wall or front tray 26 of the base 14 is removable rather than fixed and the cable openings 56 are moved from the front wall 16 to the removable base wall 26.

The illustrated base 10 can be utilized with or without the removable base wall 26. When the base wall 26 is removed, the cable 134 extends from the cord wrap 72 located within the base 14 though the open bottom of the base 14, around the bottom edge of the front wall 16, and up through the central opening of the bottom support 112 to the portable electronic device 12 removably secured to the front wall 16 (best shown in FIGS. 46 and 47). When the base wall 26 is attached, the cable 134 extends from the cord wrap 72 located within the base 14 though the open bottom of the base 14, through the cable opening 56 in the removable base wall 26, and up through the central opening of the bottom support 112 to the portable electronic device 12 removable secured to the front wall 16 (best shown in FIGS. 46 and 47).

The illustrated base wall 26 is provided with a horizontally-extending main portion 26A and a vertically-extending flange portion 26B upwardly-extending from a rear edge of the main portion 26A along the entire length of the base wall 26. It is noted however that the removable base wall 26 can alternatively have any other suitable configuration. An upper end of the illustrated flange portion 26B is provided with a forwardly-extending and downward-facing hook 136 that is configured to cooperate with an upward-facing slot 138 formed at the inner side of the bottom edge of the front wall 16. Configured in this manner, the hook 136 can be selectively inserted into and removed from the slot 138 to attach and remove the base wall 26 to and from the base 14 respectively. It is noted that the removable base wall 26 can alternatively be configured to be secured to the base 14 in any other suitable manner.

FIGS. 48 to 52 illustrate a charging station 10 for a portable electronic device 12 according to an eighth embodiment of the present invention. This embodiment further illustrates that the base 14 can take other forms. This embodiment is substantially the same as the first embodiment except that it is modified to hold a single portable electronic device 12 on a horizontal support surface such as, for example, a desktop, tabletop, countertop, or the like.

The illustrated base 14 has a substantially vertical front wall 16 and a horizontally-extending base wall 26 rearwardly-extending from a lower end of the front wall 16. The term "substantially vertical" is used to mean that the front wall 16 is no more than 45 degrees from vertical so that the portable electronic device 12 secured thereto can be easily used while recharging. The illustrated front wall 16 is at a rearwardly inclined angle of about 30 degrees from vertical. The forward side of the front wall 16 is provided with a single attachment location 46 for the portable electronic device 12 having suction cups 48 in the form of a disc of micro-suction tape as describe hereinabove. It is noted that the suction cups 48 can alternatively have any other suitable location, quantity, type, and/or shape. A bottom support 106 is located below the suction cups 48. The bottom support 106 is configured to limit downward movement of the portable electronic device 12 if the connections with the suction cups 48 inadvertently break or to provide additional support for the portable electronic device 12 when attached to the suction cups 48 by resting the portable electronic device 12 on the bottom support. The front wall 16 is provided with an opening 56 below the suction cup 48 for the passage of a cord or cable therethrough to the portable electronic device 12. The illustrated opening 56 centrally extends through the front wall 16 both above and below the bottom support 106 and also through the bottom support 106. Configured in this manner the bottom support 106 includes a pair of spaced-apart flanges 110 that are separated by the opening 56. The illustrated flanges 110 each provide an upward-facing support surface perpendicular to the front wall 16 that can support the portable electronic device 12. The central opening 56 between the flanges 110 permits a cable to downwardly extend from the portable electronic device 12, past the bottom support 106 and through the front wall 16. The rear side of the illustrated front wall 16 is provided with a cord wrap 72 so that the cable can extend from the opening 56 to the cord wrap 76.

The bottom side of the illustrated base wall 26 is provided with suction cups 48 in the form of a plurality of discs of micro-suction tape as describe hereinabove. The suction cups 48 are sized, shaped and positioned so that the base 14 can rest in a stable position on top of a horizontal support surface such as a desktop, table top kitchen countertop, night stand, or the like with a removable connection between the base 14 the supporting surface. This connection can be particularly helpful when the supporting surface is smooth and slick such as, for example, granite, to prevent the station 10 from sliding when operating the portable electronic device 12. It is noted that any other suitable location, quantity, type, and/or shape of suction cups 48 can alternatively be utilized. Additionally, any other suitable type of feet can alternatively be utilized.

The illustrated base 14 is formed from a suitable sheet metal such as, for example, a steel sheet metal. Constructed in this manner the bottom support 106 is integral with and fixed to the front wall 16. It is noted, however, that the base 14 can alternatively be manufactured from a different process such as, for example, injection molding and the like and/or a different material such as, for example plastic, wood, and the like.

FIGS. 53 to 58 illustrate a charging station 10 for a portable electronic device 12 according to a ninth embodiment of the present invention. This embodiment further illustrates that the base 14 can take other forms. This embodiment is substantially the same as the first embodiment except that it is modified to hold a single portable electronic device 12 on a vertical support surface such as, for example, a wall or the like.

The illustrated base 14 has a substantially vertical front wall 16 and a substantially vertical rear wall 16. The term "substantially vertical" is used to mean that the front wall 16 is no more than 45 degrees from vertical so that the portable electronic device 12 secured thereto can be easily used while recharging. The illustrated front wall 16 has a forward side or surface 16A that is at a rearwardly inclined angle of about 10 degrees from vertical and forms an angle of about 10 degrees with a rear side or surface 16B of the front wall 16. It is noted that the forward side can alternatively be at any other suitable angle that is substantially vertical. The forward side 16A of the front wall 16 is provided with a single attachment location 46 for the portable electronic device 12 having suction cups 48 in the form of a disc of micro-suction tape as describe hereinabove. It is noted that the suction cups 48 can alternatively have any other suitable location, quantity, type, and/or shape. A bottom support 106 is located below the suction cups 48. The bottom support 106 is configured to limit downward movement of the portable electronic device 12 if the connections with the suction cups 48 inadvertently break or to provide additional support for the portable electronic device 12 when attached to the suction cups 48 by resting the portable electronic device 12 on the bottom support. The illustrated bottom support 106 is provided with a central opening 56 for the passage of a cord or cable therethrough to the portable electronic device 12. Configured in this manner the bottom support 106 includes a pair of spaced-apart flanges 110 that are separated by the opening 56. The illustrated flanges 110 each provide an upward-facing support surface perpendicular to the front wall 16 that can support the portable electronic device 12.

The rear side 16B of the illustrated front wall 16 is provided with at least one fastener 18 for removably securing the base 14 to a vertical support surface such as, for example, a wall, mirror, and the like. The illustrated fastener 18 is suction cups 48 in the form of a disc of micro-suction tape as describe hereinabove. The suction cups 48 are sized, shaped and positioned so that the base 14 can removably secured to the vertical support surface. It is noted that any other suitable location, quantity, type, and/or shape of suction cups 48 can alternatively be utilized. For example, it may be desired to cover the entire rear side 16B with micro-suction tape to increase the holding power. Additionally, it is noted that any other suitable location, quantity, type, and/or shape of fastener 18 can alternatively be utilized such as, for example, Command Strips available from the 3M Co., Dual Lock fasteners available from the 3M Co., hook and loop fastener, double sided pressure-sensitive adhesive tape, mechanical fasteners, magnets, or any other suitable fastening means. When the fastener 18 is in the form of at least one magnet, the at least one magnet can be molded into the base 14. It is noted that the rear surface 16B can alternatively be provided with a fastener for permanently securing the base 14 to a vertical support surface such as, for example, a wall, mirror, and the like. The permanent fastener can be a strip of very high bond (VHB) adhesive, and the like or any other suitable permanent type of fastener. The illustrated rear side 16B of the front wall 16 is also provided with a pair of notches or handholds 140 configured to provide a location that the user can grab when removing the base 14 from a vertical support to which it is removably attached. The illustrated notches or handholds 140 are located at opposed lower ends of the rear side 16b the outer lateral edges of the rear side 16B. It is noted that the notches or handholds 140 can alternatively have any other suitable configuration.

The illustrated base 14 is cast from a suitable plastic material such as, for example, urethane. Constructed in this manner the base 14 is of one-piece construction with the bottom support 106 integral with and fixed to the front wall 16. It is noted, however, that the base 14 can alternatively be manufactured from any other suitable process such as, for example, injection molding and the like and/or any other suitable material such as, for example, other plastic materials, metal, wood, and the like.

FIGS. 59 to 69 illustrate a variation of the station 10 for a portable electronic device 12 according to the ninth embodiment of the invention shown in FIGS. 53 to 58, wherein the base 14 can be supported both on a vertical support surface such as, for example, a wall or a mirror and the like and within a desktop receiver or receptacle 142 supporting the base 14, and the portable electronic device 12 therein, on a horizontal support surface such as, for example a desktop, countertop, a table top, and the like. Thus, the base 14 can be used as a standalone holder when handheld or attached to a vertical wall or can be used as a charging station when attached to a vertical support surface or supported by the receptacle 142 on a horizontal support surface.

Figure 63:
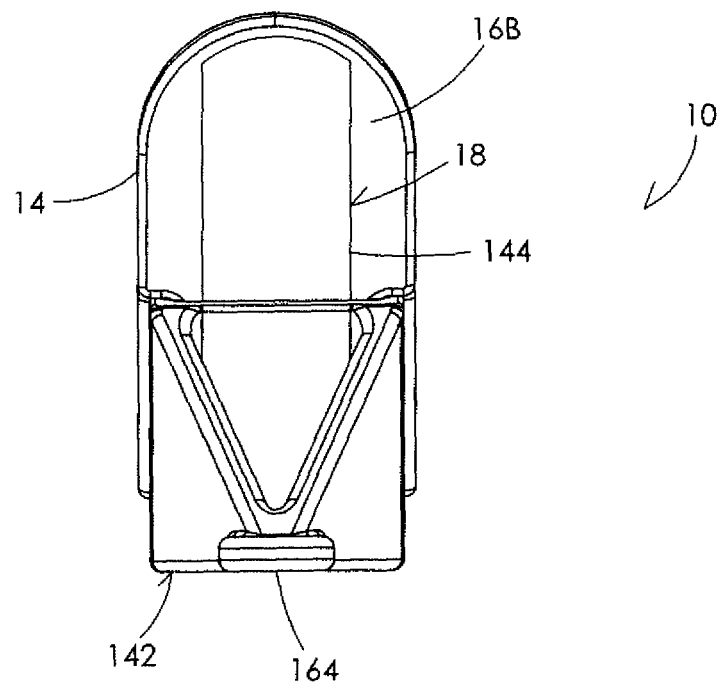
FIG. 63 is a rear elevational view of the station of FIGS. 59 to 62.
Figure 64:
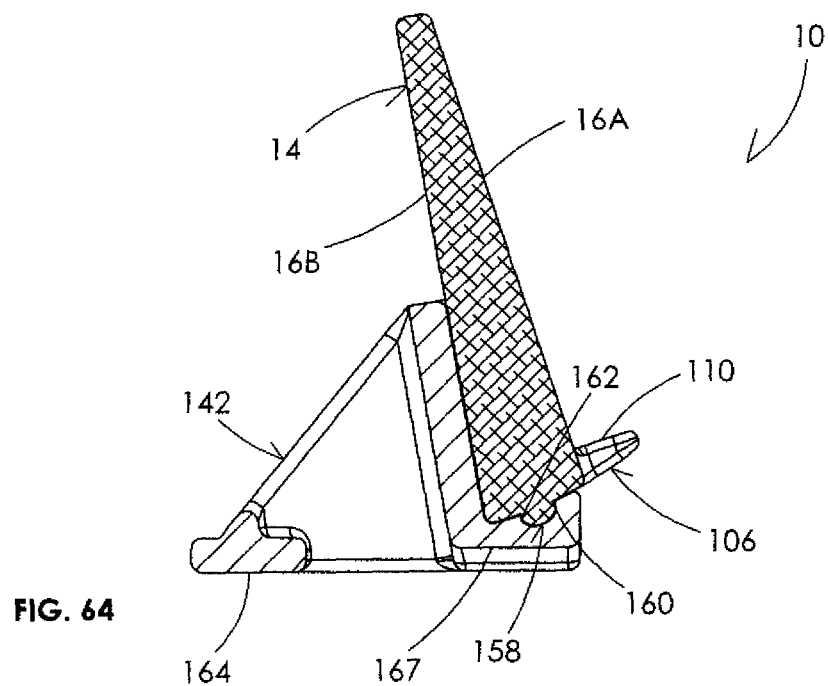
FIG. 64 is a cross-sectional view taken along line 64-64 in FIG. 59.
Figure 65:
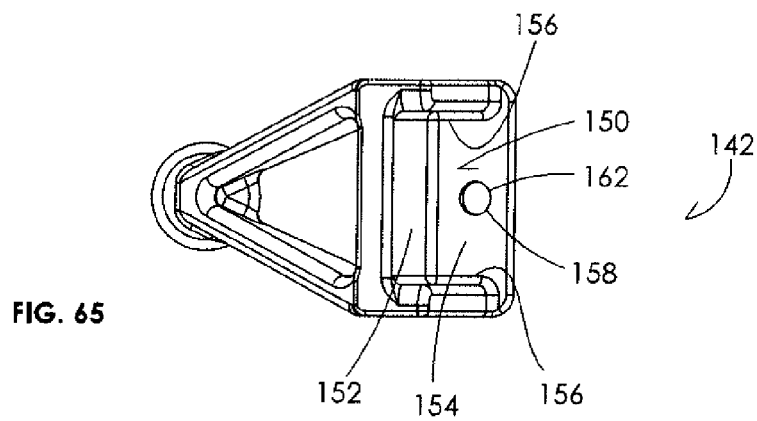
FIG. 65 is a top plan view of the desktop receiver of the station of FIGS. 59 to 64.
Figure 66:
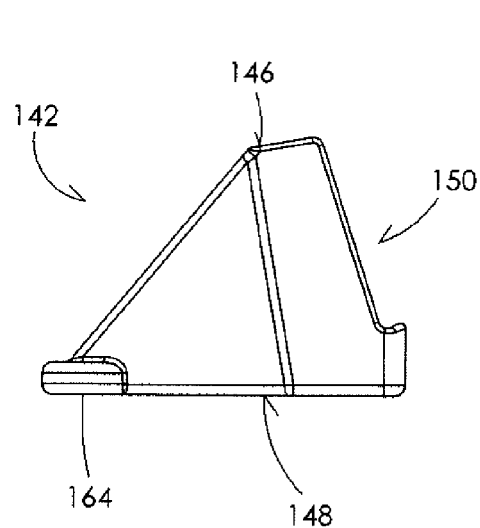
FIG. 66 is a right-side elevational view of the desktop receiver of FIG. 65, the left-side elevational view being a mirror image thereof.
Figure 67:
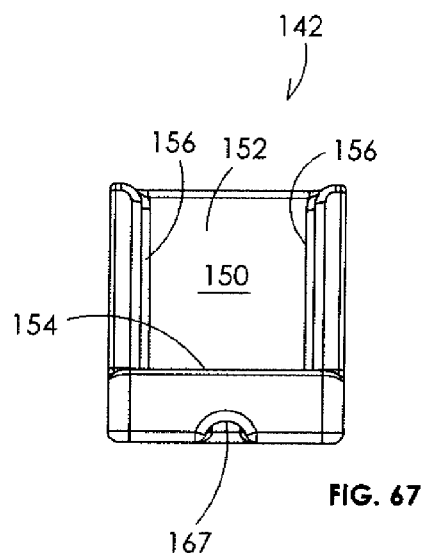
FIG. 67 is a front elevational view of the desktop receiver of FIGS. 65 and 66.
Figure 68:
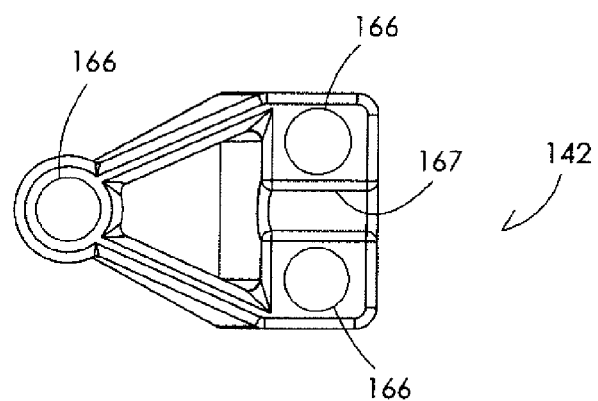
FIG. 68 is a bottom plan view of the desktop receiver of FIGS. 65 to 67.

The base 14 is the same as described hereinabove with regard to FIGS. 53 to 58 except that the rear fastener 18 is a strip of stretch releasing adhesive tape 144 instead of the suction cup 48 vertically extending down the center of the rear side 16B near the top of the rear side 16B and above the handholds 140 (best seen in FIG. 63). Commercially available stretch releasing adhesive tapes include products sold under the trademarks COMMAND by Minnesota Mining and Manufacturing Company, of St. Paul, Minn., and products sold under the trademark POWERSTRIPS by Beiersdorf AG, of Hamburg, Germany. These products are currently manufactured as strips with one end of the strip including a non-adhesive pull tab to facilitate stretching of the strip during the removal process. It is noted that any other suitable location, quantity, type, and/or shape of fastener 18 can alternatively be utilized such as, for example, suction cups, Dual Lock fasteners available from the 3M Co., hook and loop fastener, other types of double sided pressure-sensitive adhesive tape, mechanical fasteners, or any other suitable fastening means.

The illustrated receiver or receptacle 142 is configured to selectively support the base 14, with personal electronic device 12 thereon, a on a horizontal support surface such as, for example a desktop, countertop, a table top, and the like (best shown in FIGS. 59 to 64). The illustrate receptacle has a top portion 146 configured for supporting the base 14 and a bottom portion 148 configured for resting on and/or attachment to the horizontal support surface. The illustrated top portion 146 includes a recess or cavity 150 sized and shaped for receiving the lower end of the base 14 therein. The illustrated cavity has a rear wall 152 configured to engage and support the rear wall 16B of the base 14, a bottom wall 154 configured to engage and support the bottom of the base 14, and side walls 156 configured to cooperate with and extend into the handholds 140 if the base 14. The illustrated cavity 150 is open at its top and front sides so that a bottom portion of the base 14 can rest in the cavity 150 with a top portion of the base extending above the cavity 150 and the front side 16A of the base 14 outside of the cavity 150. Positioned in this manner, the fastener 18 on the rear side 16B of the base 14 is located outside the cavity 150. Configured in this manner the base 14 can be selectively inserted in the cavity 150 so that the portable electronic device 12 (and the base 14 attached thereto) is removably supported on the horizontal surface and selectively removed from the cavity 150 so that the portable electronic device (and base 14 attached thereto) can be handheld or removably attached to a vertical support surface.

The illustrated base and receptacle 14, 142 are provided with a detent 158 configured to resist forward pivoting movement of the base 14 about its lower end and out of the cavity 150 when a rearward force directed near the top of the base 14. The illustrated detent 158 is in the form of a protrusion 160 downwardly extending from the bottom of a base 14 and a depression 162 in the bottom wall of the cavity 150. The illustrated detent 158 resists the unwanted movement but permits the base 14 to be easily and quickly inserted and removed from the cavity 150. It is noted that the detent 158 can alternatively be of any other suitable type.

The illustrated bottom portion 148 of the receptacle 142 has a downward-facing planar bottom surface 164 configured to engage the horizontal support surface so the receptacle 142 is supported on the horizontal support surface. The illustrated bottom surface 164 is formed by three separate spaced-apart portions but the bottom surface 164 can have any other suitable form such a, for example, a continuous surface. Two of the illustrated portions of the bottom surface are laterally spaced apart and located below the cavity 150. The illustrated third portion of the bottom surface 164 is laterally located between the first two portions and located rearward of the first two portions a distance which provides adequate stability for the receptacle 142 when the portable electronic device 12 is operated while supported by the receptacle 142. The illustrated bottom surface 164 is provided with at least one fastener 166 for removably securing the receptacle 142 to the horizontal support surface. The illustrated bottom surface 164 has three of the fasteners 166 with one of the three fasteners 166 located at each of the three spaced-apart portions of the bottom surface 164. The illustrated fasteners 166 are suction cups 48 in the form of a disc of micro-suction tape as describe hereinabove. The suction cups 48 are sized, shaped and positioned so that the receptacle 142 can removably secured to the horizontal support surface. It is noted that any other suitable location, quantity, type, and/or shape of suction cups 48 can alternatively be utilized. For example, it may be desired to cover the entire bottom surface 164 with micro-suction tape to increase the holding power. Additionally, it is noted that any other suitable location, quantity, type, and/or shape of fastener 166 can alternatively be utilized such as, for example, Command Strips available from the 3M Co., Dual Lock fasteners available from the 3M Co., hook and loop fastener, double sided pressure-sensitive adhesive tape, mechanical fasteners, or any other suitable fastening means.

The illustrated bottom portion 148 of the receptacle 142 has a routing groove 167 configured for routing power cords or cables and the like through the routing groove 167 to the personal electronic device 12 located on the bottom support 106 of the base 14. The illustrated groove 167 is centrally located in the lateral direction so that it is laterally aligned with the central opening 56 in the base bottom support 106. The illustrated routing groove is formed in the bottom surface 165 of the receptacle 142 and is open at forward and rearward ends so that power cords or cables and the like can extend through the routing groove 167 when the receptacle 142 is resting on the horizontal support surface. With the personal electronic device 12 located on the bottom support 106 of the base 14, a connector of the power cord or cable and the like can be connected to a connector at the bottom of the personal electronic device 12 through the central opening 56 in the bottom support 106. The power cord or cable and the like extends downward from the connector and then is bent rearwardly so that it can pass through the routing groove 167 to the rear of the receptacle 142. The other end of the power cord or cable and the like can then be connected to a desired power source, another device, etc.

As best shown in FIG. 70, the base 14 can alternatively be permanently secured to the desktop receptacle 142 rather than removably supported thereon. This configuration can be desirable when used in a commercial environment such as, for example, on a retail counter. The illustrated base 14 is permanently secured to the receptacle 142 with a layer of adhesive 168 between the base 14 and the receptacle 142 within the cavity. It is noted that the base 14 can alternatively be permanently secured to the receptacle 142 in any other suitable manner if desired.

As best shown in FIG. 71, the receptacle 142 can alternatively be permanently secured to the horizontal support surface rather than removably supported thereon. This configuration can be desirable when used in a commercial environment such as, for example, on a retail counter. The illustrated fasteners 166 of the illustrated receptacle 142 are threaded inserts 170 configured to receive cooperating threaded bolts to bolt the receptacle to the horizontal support surface. It is noted that the base 14 can alternatively be permanently secured to the receptacle 142 in any other suitable manner if desired.

A user can removably secure their portable electronic device 12 to the base 14 and either (1) use the portable electronic device 12/base 14 in a hand held manner, (2) use the portable electronic device 12/base 14 in a handheld manner by attaching the portable electronic device 12/base 14 to a vertical support surface by attaching the rear faster 18 of the base 14 to the vertical support surface, or (3) use the portable electronic device 12/base 14 in a handheld manner by supporting the portable electronic device 12/base 14 on a horizontal support surface by inserting the portable electronic device 12/base 14 into the cavity 150 of a receptacle 142 supported on the horizontal support surface. Thus, for example, a user could start the day with their portable electronic device 12/base 14 in a receptacle resting on their nightstand. The user can get up out of bed and grab the portable electronic device 12/base 14 and walk into the bathroom and secure the portable electronic device 12/base 14 to a mirror where you have a cooperating fastener 18 such as a Command strip. After finishing needs in the bathroom, the user grabs the portable electronic device 12/base 14 off of the base and goes downstairs to an office where they insert the portable electronic device 12/base 14 into the cavity 150 of a receptacle 142 supported on a desk. The user can take their portable electronic device 12/base 14 anywhere in their home, vehicle, work place etc. and support the portable electronic device 12/base 14 for hands-free operation anywhere they desire.

The illustrated components can be sold in a variety of different kits. For example, a first kit can include (1) at least one base 14; (2) at least one fastener 48 for selective attachment of the portable electronic device 12 to the base 14; and (3) at least one fastener 18, and preferably more than one fastener 18, for selective attachment of the base 14 to a vertical support surface. The first kit can include more than one fastener 48 wherein the fasteners 48 can have more than one holding strength so that the user can select one of the fasteners 48 in the kit with a desired holding strength, either by using multiple fasteners 48 or a fastener 48 with greater holding strength, to secure their portable electronic device 12 to the base 14. The first kit can also include more than one fastener 18 wherein the fasteners 18 can have more than one holding strength so that the user can select one of the fasteners 18 in the kit with a desired holding strength, either by using multiple fasteners 18 or a fastener 18 with greater holding strength, to secure the base 14 to a vertical support surface. For example, the fasteners 48 can be a plurality of discs of micro-suction tape having different diameters and thus different holding powers. It is noted that there is a delicate balance between the pull force needed to remove the portable electronic device 12 from the base 14 and the pull force needed to remove the base 14 off of the vertical support surface. A 1-inch diameter disc of micro-suction tape seems to prove a good hold but not enough to disengage dual lock between the base 14 and a wall when pulling the portable electronic device off of the base 14 while the base 14 is attached to the wall. A 1.5-inch diameter disc of micro-suction tape seems to prove a good hold but not enough to disengage two 3M Command strips between the base 14 and a wall when pulling the portable electronic device off of the base 14 while the base 14 is attached to the wall. This balance is dependent on the surface finish of the portable electronic device 12. By having this variety of fasteners, 48, 18, the user is provided with options to configure the station as they desire. It is noted that the fasteners 18 can additionally include or alternatively be permanent fasteners such as, for example, a very high bond (VHB) adhesive strip and the like. For example, a second kit can include: (1) at least one base 14; (2) at least one receptacle 142; (3) at least one fastener 48 for selective attachment of the portable electronic device 12 to the base 14; (4) at least one fastener 18, and preferably more than one fastener 18, for selective attachment of the base 14 to a vertical support surface. The second kit can include more than one fastener 48 wherein the fasteners 48 can have more than one holding strength so that the user can select one of the fasteners 48 in the kit with a desired holding strength, either by using multiple fasteners 48 or a fastener 48 with greater holding strength, to secure their portable electronic device 12 to the base 14. The second kit can also include more than one fastener 18 wherein the fasteners 18 can have more than one holding strength so that the user can select one of the fasteners 18 in the kit with a desired holding strength, either by using multiple fasteners 18 or a fastener 18 with greater holding strength, to secure the base 14 to a vertical support surface. For example, a third kit can include: (1) at least one base 14; (2) at least one receptacle 142 permanently attached to the base 14; and (3) at least one fastener 48 for selective attachment of the portable electronic device 12 to the base 14; The second kit can include more than one fastener 48 wherein the fasteners 48 can have more than one holding strength so that the user can select one of the fasteners 48 in the kit with a desired holding strength, either by using multiple fasteners 48 or a fastener 48 with greater holding strength, to secure their portable electronic device 12 to the base 14. In addition to the above described kits, the receptacle 142 can be sold alone for users that want additional bases around the house, office etc.

Any of the features or attributes of the above the above described embodiments and variations can be used in combination with any of the other features and attributes of the above described embodiments and variations as desired.

It is apparent from the above detailed description of preferred embodiments of the present invention, that the illustrated stations 10 improve visibility and usability of the personal electronic devices during charging. Thus, these stations 10 will allow easy viewing of streaming videos and the like on the portable electronic devices 12 while not depleting the battery. This is particularly important with the migration of television, movies, and other videos to tablet computers. The illustrated stations 10 fulfill the need to secure tablet computers and the like on a wall or a desktop for viewing. The illustrated stations 10 also make it convenient for individuals to use and charge their phone on their night stand next to their bed. Thus, their cell phones can be used as an alarm clock and a replacement for their land line. Additionally, some of the illustrated stations 10 organize and hold other objects that do not need to be charged such as mail 130, keys 132, wallets and the like to avoid clutter and misplacement of the items. Furthermore, the illustrated stations 10 provide better wire management and control than products in the prior art. Moreover, some of the illustrated charging stations 10 can be both mounted to a wall and supported on a table top so the user can select which way they desire to use the station 10.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A station for viewing and operating a portable electronic device, said station comprising, in combination:
    a wall plate having a rearward-facing back wall configured to be selectively secured on a vertically-extending support surface;
    a receptacle configured for selectively holding the wall plate and configured to be supported on a horizontally-extending support surface;
    wherein the wall plate has a forward-facing front wall configured to be rearwardly inclined no more than 45 degrees from vertical when the back wall is secured on the vertically-extending support surface and configured to support the portable electronic device so that the portable electronic device can be viewed and operated without holding the portable electronic device;
    at least one fastener on the forward-facing front wall configured to temporarily secure the portable electronic device to the forward-facing front wall to limit movement of the personal electronic device relative to the wall plate;
    at least one fastener on the rearward-facing back wall configured to secure the wall plate to the vertically-extending support surface;
    at least one fastener on the receptacle configured to secure the receptacle to the horizontally-extending support surface and
    wherein the wall plate has a bottom support located at a bottom of the forward-facing front wall to limit downward movement of the portable electronic device relative to the wall plate.

2. The station according to claim 1, wherein the at least one fastener on the receptacle is configured to removably secure the receptacle to the horizontally-extending support surface.

3. The station according to claim 2, wherein the at least one fastener on the receptacle is at least one suction cup.

4. The station according to claim 3, wherein the at least one suction cup on the receptacle is micro-suction tape.

5. The station according to claim 2, wherein the at least one fastener on the receptacle is at least one threaded insert configured to receive a cooperating threaded bolt to bolt the receptacle on the horizontally-extending support surface.

6. The station according to claim 1, wherein the wall plate is secured to the receptacle with very high bond (VHB) adhesive.

7. The station according to claim 1, wherein the wall plate is removably supported on the receptacle and further comprising a detent formed between the wall plate and the receptacle to prevent rotation of the wall plate relative to the receptacle.

8. The station according to claim 1, wherein the at least one fastener on the receptacle is configured to permanently secure the receptacle to the horizontally-extending support surface.

9. The station according to claim 8, wherein the at least one fastener on the receptacle comprises very high bond (VHB) adhesive.

10. The station according to claim 1, wherein the at least one fastener on the forward-facing front wall is at least one suction cup.

11. The station according to claim 10, wherein the at least one suction cup on the forward-facing front wall is micro-suction tape.

12. The station according to claim 1, wherein the at least one fastener on the rearward-facing back wall is configured to removably secure the wall plate to the vertically-extending support surface.

13. The station according to claim 12, wherein the at least one fastener on the rearward-facing back wall is at least one suction cup.

14. The station according to claim 13, wherein the at least one suction cup on the rearward-facing back wall is micro-suction tape.

15. The station according to claim 12, wherein the at least one fastener on the rearward-facing back wall is at least one removable adhesive strip.

16. The station according to claim 12, wherein the at least one fastener on the rearward-facing back wall is at least one hook and loop fastener.

* * * * *